(12) United States Patent
Takahashi et al.

(10) Patent No.: US 9,383,194 B2
(45) Date of Patent: Jul. 5, 2016

(54) IMAGE FORMING APPARATUS, INSPECTION APPARATUS, AND INSPECTION METHOD

(71) Applicants: Osamu Takahashi, Nagoya (JP); Noritaka Iwama, Nagoya (JP)

(72) Inventors: Osamu Takahashi, Nagoya (JP); Noritaka Iwama, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 13/963,481

(22) Filed: Aug. 9, 2013

(65) Prior Publication Data

US 2014/0043601 A1    Feb. 13, 2014

(30) Foreign Application Priority Data

Aug. 10, 2012 (JP) ................................ 2012-178424

(51) Int. Cl.
G01B 11/00 (2006.01)
G01B 11/26 (2006.01)

(52) U.S. Cl.
CPC .................................... *G01B 11/26* (2013.01)

(58) Field of Classification Search
CPC ........ G01B 11/26; G03B 27/72; G03G 15/08; G03G 15/06; G03G 15/01; G03G 15/0194; G03G 15/5058; G03G 15/0178; G03G 13/04; G06K 15/1878
USPC ......................................... 356/138, 399–401
See application file for complete search history.

(56) References Cited

U.S. PATENT DOCUMENTS

| 8,238,804 | B2 * | 8/2012 | Murayama | G03G 15/0131 399/301 |
| 2006/0139433 | A1 * | 6/2006 | Yoshida | 347/116 |
| 2008/0181634 | A1 | 7/2008 | Kinoshita | |
| 2009/0213399 | A1 * | 8/2009 | Ikeda | 358/1.9 |
| 2010/0178084 | A1 * | 7/2010 | Kang et al. | 399/301 |
| 2010/0239294 | A1 * | 9/2010 | Kosako et al. | 399/66 |
| 2011/0013949 | A1 * | 1/2011 | Kawase | G03G 15/0178 399/301 |
| 2012/0294637 | A1 * | 11/2012 | Tanaka et al. | 399/49 |

FOREIGN PATENT DOCUMENTS

| JP | 2005049467 A | 2/2005 |
| JP | 2006-251123 A | 9/2006 |
| JP | 2007-025315 A | 2/2007 |
| JP | 2008-180946 A | 8/2008 |
| JP | 2009122437 A | 6/2009 |
| JP | 2009-223248 A | 10/2009 |
| JP | 2010-049031 A | 3/2010 |
| JP | 2010091935 A | 4/2010 |
| JP | 2010-217556 A | 9/2010 |
| JP | 2012-042884 A | 1/2012 |

OTHER PUBLICATIONS

Japanese Office Action dated Apr. 26, 2016 received in related application JP 2012-178424 together with an English language translation.

* cited by examiner

*Primary Examiner* — Tarifur Chowdhury
*Assistant Examiner* — Isiaka Akanbi
(74) *Attorney, Agent, or Firm* — Scully, Scott, Murphy & Presser, P.C.

(57) ABSTRACT

In an image forming apparatus, an error detection mark is formed by using an image forming unit on the surface of a carrier along a detection line passing through an exposure position in a carrier moving direction. The error detection mark includes a first mark and a second mark spaced from each other by a fixed distance in the carrier moving direction. The error detection mark is measured by the sensor. A measurement error of the sensor for a registration mark is determined based on the measured values for the first mark and second mark. A registration mark is formed by using the image forming unit on the surface of the carrier on the detection line. The registration mark is measured using the sensor. Offset of an image-forming position is corrected based on the determined measurement error and a measured value for the registration mark.

14 Claims, 17 Drawing Sheets

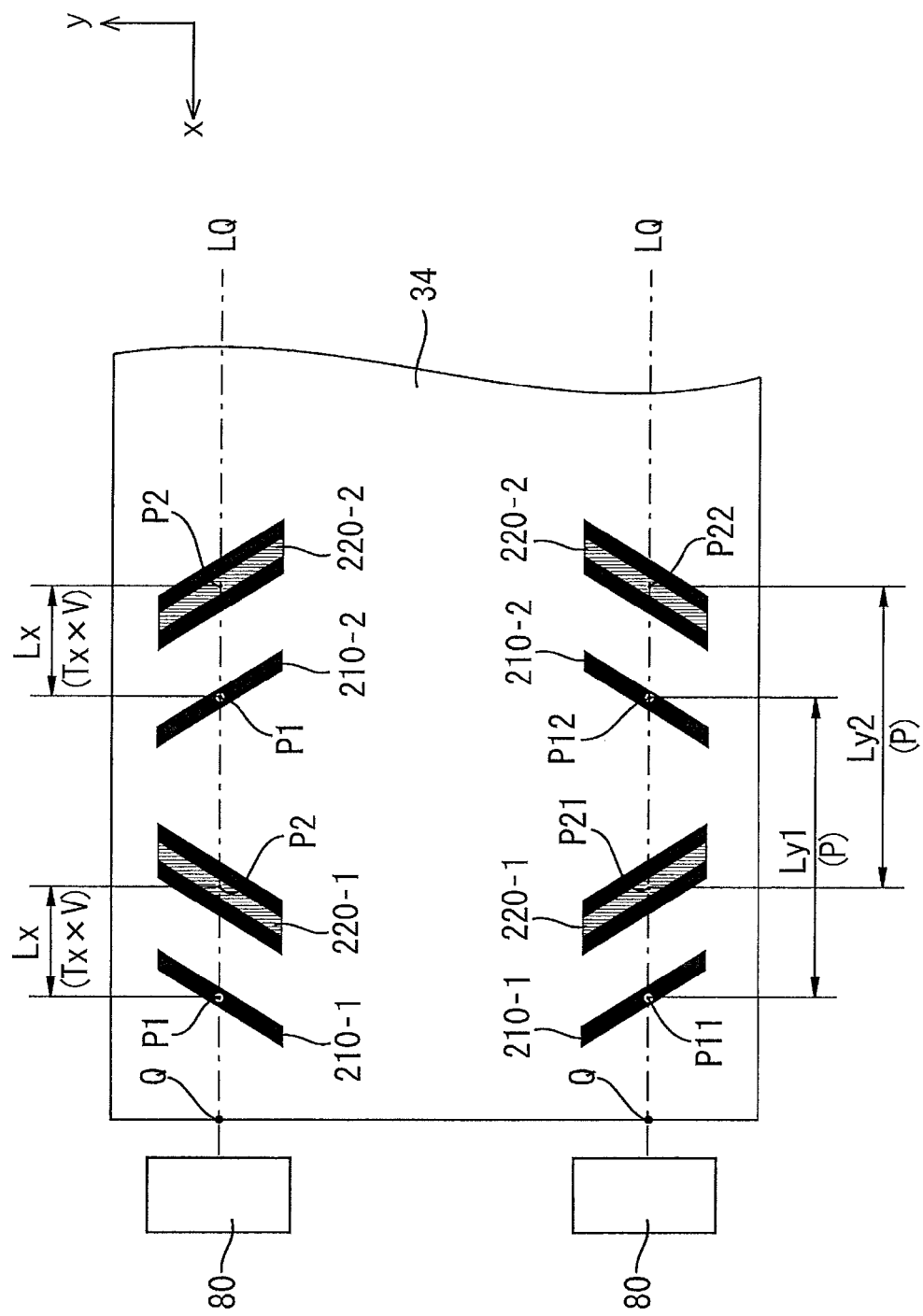

FIG. 10

X DIRECTION

| LIGHT REFLECTANCE OF BELT SURFACE | OFF-AXIS ANGLE IN X DIRECTION | DIFFERENCE △Lx BETWEEN CENTER-POINT DISTANCE LX AND THEORETICAL VALUE | MEASUREMENT ERROR Ux IN X DIRECTION FOR REGISTRATION MARK MEASURED BY MARK SENSOR |
|---|---|---|---|
| 25% | 1° | △Lx1 | Ux1 |
|  | 2° | △Lx2 | Ux2 |
|  | 3° | △Lx3 | Ux3 |
| 45% | 1° | △Lx4 | Ux4 |
|  | 2° | △Lx5 | Ux5 |
|  | 3° | . | . |
| 65% | 1° | . | . |
|  | 2° | . | . |
|  | 3° |  |  |

Y-DIRECTION

| LIGHT REFLECTANCE OF BELT SURFACE | OFF-AXIS ANGLE IN Y DIRECTION | DIFFERENCE △Ly BETWEEN CENTER-POINT DISTANCES LY1 AND LY2 | MEASUREMENT ERROR Uy IN Y DIRECTION FOR REGISTRATION MARK MEASURED BY MARK SENSOR |
|---|---|---|---|
| 25% | 1° | △Ly1 | Uy1 |
|  | 2° | △Ly2 | Uy2 |
|  | 3° | △Ly3 | Uy3 |
| 45% | 1° | △Ly4 | Uy4 |
|  | 2° | △Ly5 | Uy5 |
|  | 3° | . | . |
| 65% | 1° | . | . |
|  | 2° | . | . |
|  | 3° |  |  |

IMAGE FORMING APPARATUS, INSPECTION APPARATUS, AND INSPECTION METHOD

CROSS REFERENCE TO RELATED APPLICATION

This application claims priority from Japanese Patent Application No. 2012-178424 filed Aug. 10, 2012. The entire content of this priority application is incorporated herein by reference.

TECHNICAL FIELD

The present invention relates to technology of determining measurement error of a sensor.

BACKGROUND

There has been proposed an image forming apparatus that has a function of correcting misalignment of image forming positions on a sheet, for example. More specifically, an image, such as a registration pattern having a plurality of marks, is formed on a surface of a belt. A detection sensor of an optical type, whose detecting region is defined on the surface of the belt, is employed. Positions of the marks are detected based on a light reception signal outputted from the detection sensor. Misalignment of image forming positions are corrected based on the detection results.

However, a measurement error possibly occurs between the positions of the marks detected by the detection sensor and the actual positions of the marks. This measurement error degrades the accuracy in correcting the image forming positions. Japanese Unexamined Patent Application Publication No. 2007-025315 has noted that there is certain relationship between the amount of the measurement error and the amount of distortion that is generated in the detection waveform due to a diffuse reflection light. The publication describes that the measurement error is determined by measuring the amount of distortion in the detection waveform.

SUMMARY

The method described in the above-described publication, however, has to sample the detection waveform at a relatively high resolution, in order to actually measure the amount of distortion in the detection waveform. An expensive signal processing circuit has to be employed. Calculation of the measurement error becomes complicated.

In view of the foregoing, it is an object of the invention to provide an image forming apparatus, an inspection apparatus, and an inspection method that can determine the measurement error of a detection sensor in a simple manner.

In order to attain the above and other objects, the invention provides an image forming apparatus including: a carrier; an image forming unit; a sensor; and a control unit. The carrier is configured to move circularly in one direction. The image forming unit is configured to form an image on a surface of the carrier by using a developing agent. The sensor has a light-emitting element and a light-receiving element, the light-emitting element being configured to emit light toward an exposure position on the surface of the carrier, the light-receiving element being configured to receive light reflected off the carrier and output a light-reception signal corresponding to an intensity of the received light. The control unit is configured to perform: an error detection mark forming process to form, by using the image forming unit, an error detection mark on the surface of the carrier along a detection line that passes through the exposure position in a carrier moving direction, in which the carrier is configured to move, the error detection mark being an image including a first mark and a second mark that are spaced from each other by a fixed distance in the carrier moving direction; a first measurement process to measure the error detection mark using the sensor when the error detection mark reaches the exposure position; a measurement error determination process to determine a measurement error of the sensor for a registration mark based on measured values for the first mark and second mark obtained by the first measurement process; a registration mark forming process to form, by using the image forming unit, the registration mark on the surface of the carrier on the detection line; a second measurement process to measure the registration mark using the sensor when the registration mark reaches the exposure position; and a correction process to correct offset of an image-forming position based on the measurement error determined by the measurement error determination process and on a measured value for the registration mark obtained by the second measurement process.

According to another aspect, the present invention provides an inspection apparatus an inspection apparatus for inspecting a sensor, the sensor having a light-emitting element and a light-receiving element, the light-emitting element being configured to emit light toward an exposure position on a surface of a carrier, the light-receiving element being configured to receive light reflected off the carrier and output a light-reception signal corresponding to an intensity of the received light. The inspection apparatus includes: a carrier; an image forming unit; and a control unit. The carrier is configured to move circularly in one direction. The image forming unit is configured to form an image on a surface of the carrier by using a developing agent. The control unit is configured to perform: an error detection mark forming process to form, by using the image forming unit, an error detection mark on the surface of the carrier along a detection line that passes through the exposure position in a carrier moving direction, in which the carrier is configured to move, the error detection mark being an image including a first mark and a second mark that are spaced from each other by a fixed distance in the carrier moving direction; a first measurement process to measure the error detection mark using the sensor when the error detection mark reaches the exposure position; and a measurement error determination process to determine a measurement error of the sensor based on measured values for the first mark and second mark obtained by the first measurement process.

According to another aspect, the present invention provides a method of inspecting a sensor, the sensor having a light-emitting element and a light-receiving element, the light-emitting element being configured to emit light toward an exposure position on a surface of a carrier, the light-receiving element being configured to receive light reflected off the carrier and output a light-reception signal corresponding to an intensity of the received light, the method including: forming, by using an image forming unit, an error detection mark on a surface of a carrier along a detection line that passes through the exposure position in a carrier moving direction, in which the carrier is configured to move, the error detection mark being an image including a first mark and a second mark that are spaced from each other by a fixed distance in the carrier moving direction; measuring the error detection mark using the sensor when the error detection mark reaches the exposure position; and determining a measurement error of the sensor based on measured values for the first mark and second mark.

BRIEF DESCRIPTION OF THE DRAWINGS

The particular features and advantages of the invention as well as other objects will become apparent from the following description taken in connection with the accompanying drawings, in which:

FIG. 9 is a plan view of the belt printed with error detection marks;

FIG. 10 shows conversion tables;

DETAILED DESCRIPTION

First Embodiment

An image forming apparatus according to a first embodiment of the invention will be described with reference to FIGS. 1 through 11.

1. Overall Structure of a Printer

Figure 1:
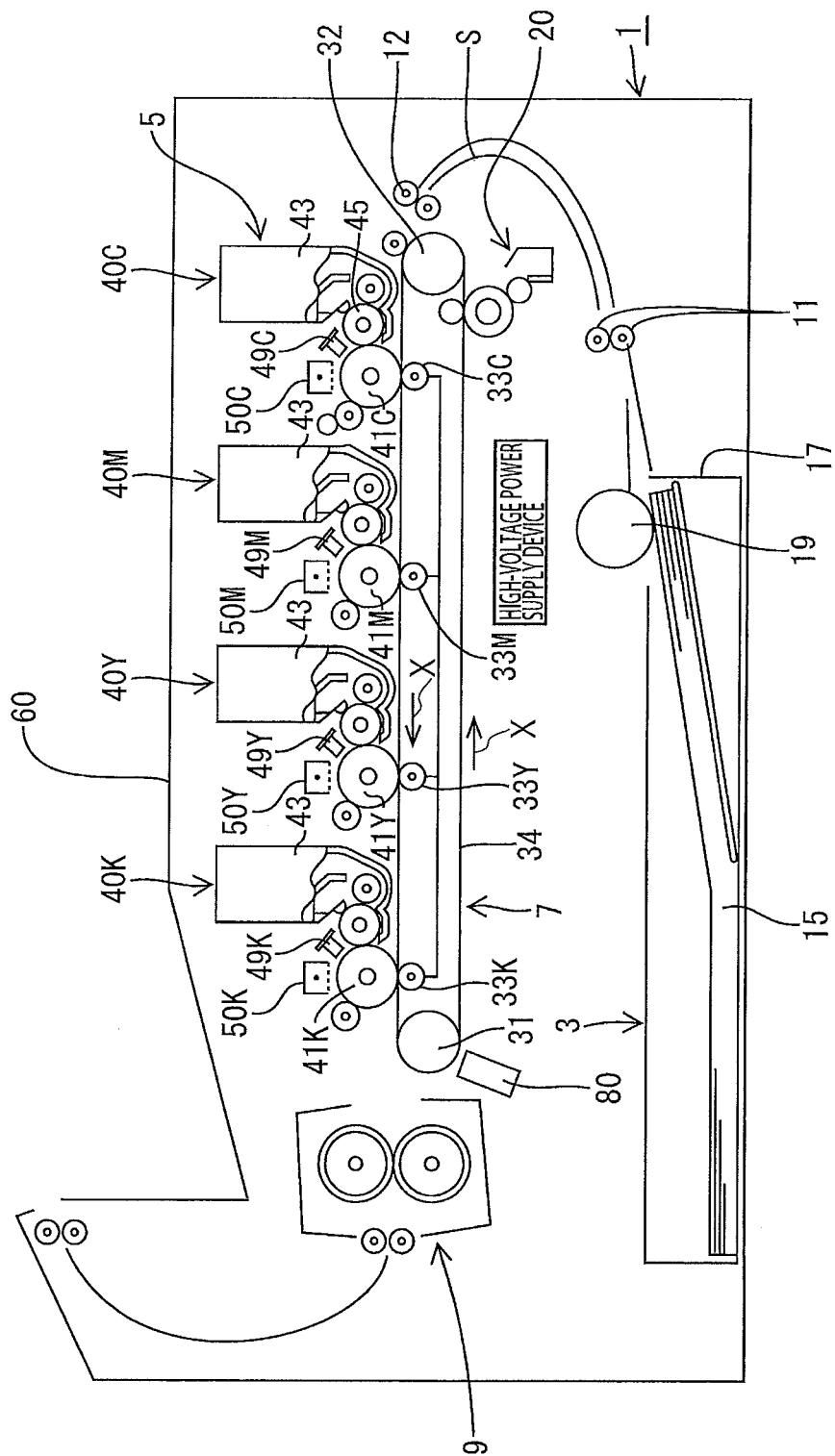
FIG. 1 is a sectional side view showing an internal structure of a printer according to a first embodiment of the present invention.

FIG. 1 is a sectional side view showing an internal structure of a printer 1 according to the first embodiment.

In the following description, a character C (cyan), M (magenta), Y (yellow), and K (black) is added after reference numeral for distinction among colors, and these characters will be omitted if specific distinction of colors is not required.

Further, in the following description, a moving direction of a belt 34 (counterclockwise direction in FIG. 1) will be referred to as "X-direction" or sub-scanning direction, and a direction perpendicular to the X-direction in a horizontal plane will be referred to as "Y-direction" or main scanning direction.

The printer 1 includes a sheet-feeding unit 3, an image-forming unit 5, a conveying mechanism 7, a fixing unit 9, a belt-cleaning mechanism 20, and a high-voltage power supply device or circuit 73. The sheet-feeding unit 3 is positioned at a lowermost portion within the printer 1, and includes a sheet tray 17 for accommodating a stack of sheets 15, and a pick-up roller 19. Each sheet 15 of the sheet stack on the sheet tray 17 is taken out successively by the pick-up roller 19, and is fed to the conveying mechanism 7 through conveying rollers 11 and registration rollers 12.

The conveying mechanism 7 is adapted to convey sheet 15, and is positioned above the sheet-feeding unit 3 within the printer 1. The conveying mechanism 7 includes a drive roller 31, a follow roller 32, and a sheet conveyer belt (hereinafter simply referred to as "belt") 34. The belt 34 is mounted over the drive roller 31 and the follow roller 32, and is circularly movable in the counterclockwise direction in FIG. 1, that is, in the X-direction. A confronting surface of the belt 34 that is in confrontation with photosensitive drums 41C, 41M, 41Y, and 41K is in the horizontal plane, and moves leftwardly in FIG. 1 when the drive roller 31 is driven to rotate. Thus, the sheet 15 fed from the registration rollers 12 is conveyed to a position below the image-forming unit 5. The "Y-direction" or main scanning direction is therefore defined along the confronting surface of the belt 34 confronting the photosensitive drums 41C, 41M, 41Y, and 41K.

Four transfer rollers 33C, 33M, 33Y, and 33K corresponding to the four photosensitive drums 41C, 41M, 41Y, and 41K, respectively are provided to the belt 34. That is, these transfer rollers are in confrontation with the photosensitive drums interposing the belt 34 therebetween.

The image-forming unit 5 includes four process units 40C, 40M, 40Y, and 40K, and four exposure units 49C, 49M, 49Y, and 49K. The process units 40C, 40M, 40Y, and 40K are arrayed in line in the belt moving direction (X-direction) or sheet feeding direction in the order of colors of cyan, magenta, yellow, and black. That is, process units 40C, 40M, 40Y for three colors except for black are positioned upstream of the process unit 40K for black in the belt moving direction X.

Process units 40 have structure identical to one another, and include the photosensitive drums 41C, 41M, 41Y, 41K for respective colors, toner cases 43 for accommodating therein toner of respective colors, developing rollers 45, and chargers 50C, 50M, 50Y, 50K. Incidentally, comparison is made with respect to diffuse reflectance of black toner and toners other than black toner (cyan toner, magenta toner and yellow toner). The diffuse reflectance of black toner is relatively low. The diffuse reflectance of toner other than black toner is higher than that of black toner, because of the fact that black color provides higher light absorption.

Each of the chargers 50C, 50M, 50Y, 50K is a scorotron type charger configured to generate corona discharge in a shielded case upon application of high voltage. Ion generated by the corona discharge flows as a discharge current through an ion discharge opening toward the corresponding photosensitive drum 41, thereby uniformly charging the surface of the photosensitive drum 41 at positive polarity.

Each of the exposure units 49C, 49M, 49Y, 49K includes a plurality of light emitting elements (such as LEDs) arrayed in line in a direction along the rotation axes of the photosensitive drums 41C, 41M, 41Y, 41K. Each exposure unit 49 is configured to emit light in accordance with print data input from an outside of the printer 1 to form an electrostatic latent image on a surface of the corresponding photosensitive drum 41C, 41M, 41Y, or 41K.

An image-forming process executed by the printer 1 having the above-described configuration will be briefly described. The printer 1 starts printing process upon receipt of print data (see FIG. 2). The surfaces of the photosensitive drums 41C, 41M, 41Y, 41K are uniformly charged with positive polarity by the chargers 50C, 50M, 50Y, 50K in accordance with rotation of the photosensitive drums 41C, 41M, 41Y, 41K. The photosensitive drums 41C, 41M, 41Y, 41K are exposed to light in accordance with print data by the exposure units 49. Thus, electrostatic latent images based on the print data are formed on the surfaces of the photosensitive drums 41C, 41M, 41Y, 41K. That is, the potential of the light-exposed regions in the uniformly charged surfaces of the photosensitive drums is lowered to provide the electrostatic latent images.

Then, positively charged toner carried on the developing rollers 45 is supplied to the electrostatic latent images formed on the surfaces of the photosensitive drums 41C, 41M, 41Y, 41K by the rotation of the developing rollers 45. Accordingly, the electrostatic latent images on the photosensitive drums 41C, 41M, 41Y, 41K are converted into visible images, so that toner images are formed through reversal development on the surfaces of the photosensitive drums 41C, 41M, 41Y, 41K.

Sheet conveying process for conveying the sheet 15 is performed concurrently with the toner image forming process. That is, each one of the sheets 15 is delivered to a sheet feed passage S from the tray 17 by the rotation of the pick-up roller 19. The sheet 15 delivered to the sheet feed passage S is conveyed by the conveying rollers 11 and the belt 34 to transfer positions (positions where the photosensitive drums 41 and the transfer rollers 33 nip the belt 34 therebetween).

Then, when the sheet 15 is moved past the transfer positions, toner images of respective colors carried on the respective surfaces of the photosensitive drums 41 are superposedly transferred onto a surface of the sheet 15 due to transfer bias applied to the respective transfer rollers 33. In this way, a multi-color toner image is formed on the surface of the sheet 15. Then, the toner image is thermally fixed to the sheet when the sheet passes through the fixing unit 9 positioned rearward of the belt 34, and the sheet 15 is discharged onto a discharge tray 60.

2. Electrical Structure of the Printer

Figure 2:
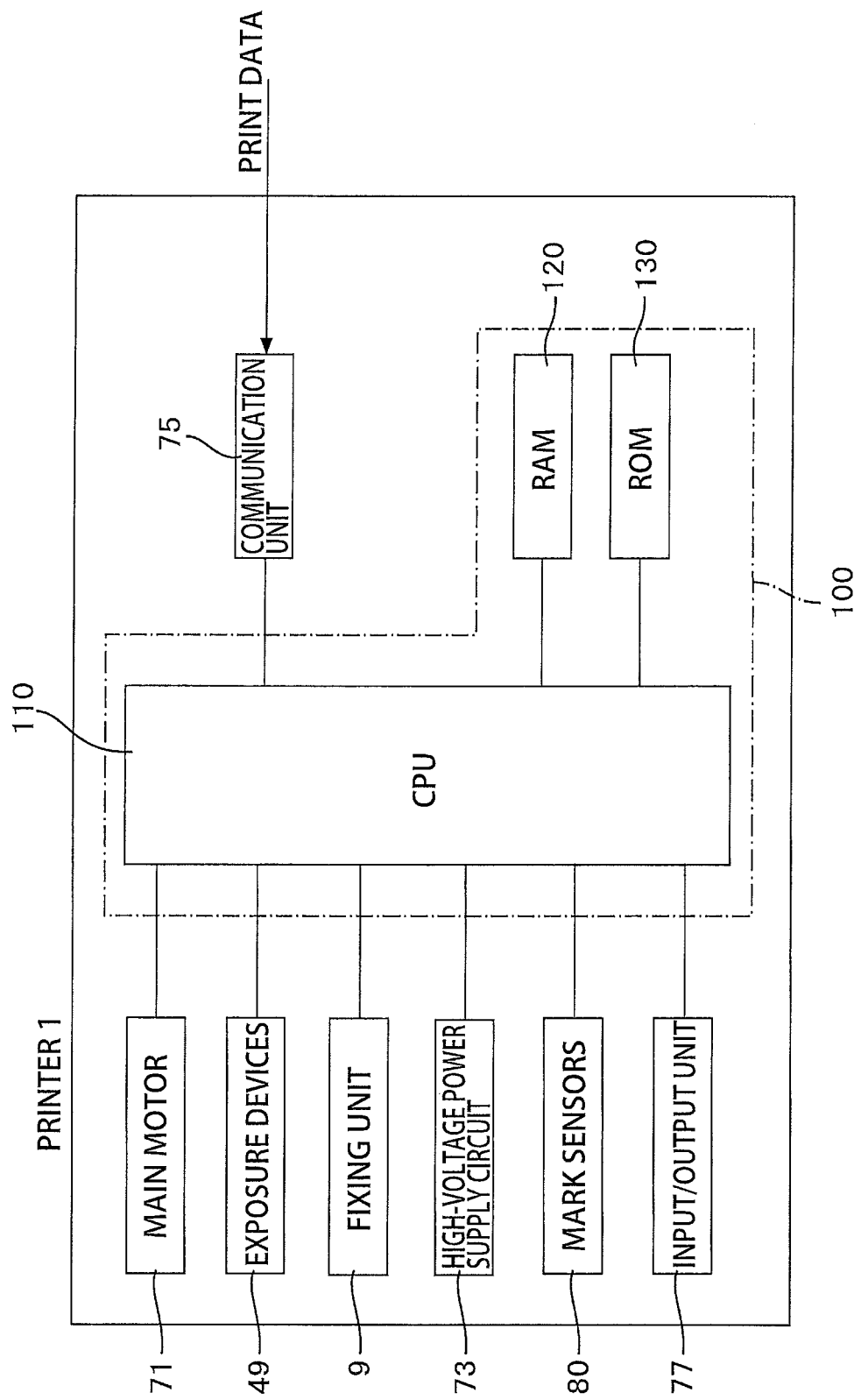
FIG. 2 is a block diagram illustrating an electrical structure of the printer in FIG. 1.

Next, the electrical structure of the printer 1 will be described. FIG. 2 is a block diagram conceptually illustrating the electrical structure of the printer 1. The printer 1 includes a main motor 71, the exposure devices 49, the fixing unit 9, the high-voltage power supply circuit or device 73, mark sensors 80 (see also FIG. 1), a communication unit 75, an input/output unit 77, and a control unit 100. The main motor 71 drives the rotation of rotary bodies in the process units, including the photosensitive drums 41 and developing rollers 45, and the rotary bodies in the sheet-conveying system, including the conveying rollers 11 and the drive roller 31. The high-voltage power supply circuit 73 functions to generate a charge voltage applied to the chargers 50 and to generate a developing voltage applied to the developing rollers 45. The communication unit 75 conducts communications with an information terminal such as a PC and functions to receive print commands, print data, and the like from the information terminal.

The control unit 100 implements overall control of the printer 1 to execute the image-forming process and functions to correct color registration offset (misalignment of printing positions among colors) on the sheet based on detection results from the mark sensors 80 described below. The control unit 100 includes a CPU 110, a RAM 120, and a ROM 130. The ROM 130 stores a program for implementing a printing process, a program for implementing a color registration correction sequence, and the like. The RAM 120 temporarily stores various data required for these processes.

3. Color Registration Correction Using Registration Marks

Figure 3:
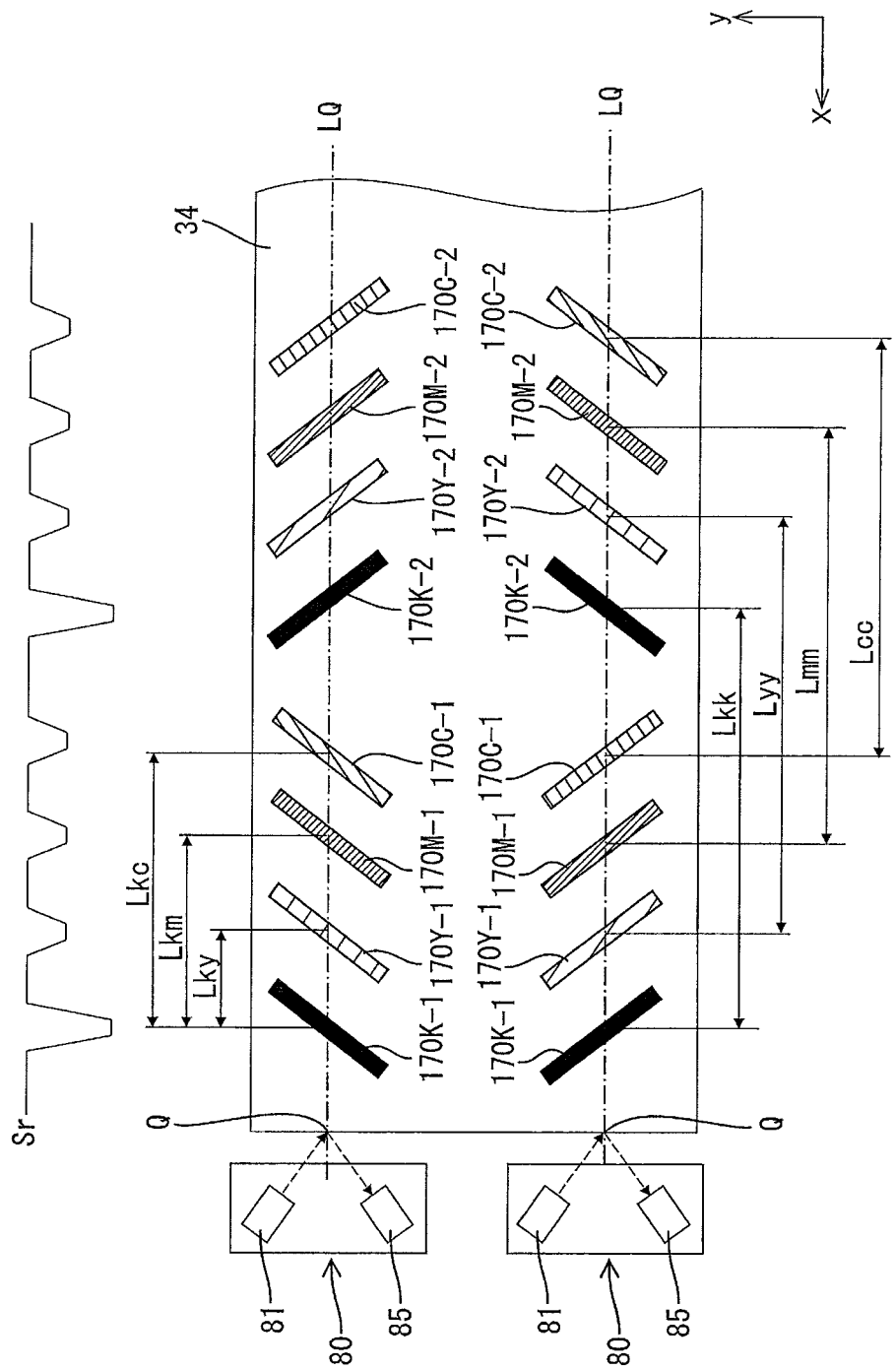
FIG. 3 is a plan view of a belt printed with registration marks.

In the present embodiment, the mark sensors 80 are mounted on the bottom rear side of the belt 34. The mark sensors 80 include two mark sensors 80 that are arranged side by side in the Y-direction as shown in FIG. 3. The mark sensors 80 function to read registration marks 170 that the image-forming unit 5 prints on the belt 34 as illustrated in FIG. 3. Based on data acquired from the mark sensors 80, the control unit 100 can correct color registration problems (misalignment of printed positions on sheet among the four colors). The image-forming unit 5 forms the registration marks 170 in each of the four colors at equal intervals along the belt 34. Each of the registration marks 170 is a line printed at a slant to the X-direction. The image-forming unit 5 prints two sets of the registration marks 170 slanted in opposite directions to each other. The registration marks 170 in FIG. 3 include black registration marks 170K, yellow registration marks 170Y, magenta registration marks 170M, and cyan registration marks 170C. In FIG. 3, the notations "-1" and "-2" are appended to the reference numerals of the registration marks 170 of each color to differentiate between the sloping directions of the registration marks.

Printing Position Corrections for the X-Direction

If the non-black process units 40C, 40M, and 40Y are properly maintained at prescribed positions relative to the black process unit 40K in the X-direction, then the process units 40 will print the registration marks 170 so that the non-black registration marks 170C, 170M, and 170Y are at prescribed intervals from the black registration mark 170K in the X-direction. Accordingly, when center-point distances Lky, Lkm, and Lkc between the center position of the black registration mark 170K and the center positions of the respective non-black registration marks 170Y, 170M, and 170C are measured, the measured values will be equal to theoretical values, indicating that there is no color registration error in the X-direction.

However, if the non-black process units 40C, 40M, and 40Y are not maintained at the prescribed positions relative to the black process unit 40K in the X-direction, the registration marks 170 will not be printed at their correct positions in the X-direction and the measured center-point distances Lky, Lkm, and Lkc will deviate from their theoretical values. Since the amount that the center-point distances Lky, Lkm, and Lkc deviate from their theoretical values is proportional to the offset in printed positions of each color relative to black in the X-direction, it is possible to minimize offset in printed positions of each color in the X-direction by adjusting the printing position for each color so that this error is reduced.

Printing Position Corrections for the Y-Direction

Similarly, if the non-black process units 40C, 40M, and 40Y are not maintained at prescribed positions relative to the black process unit 40K in the Y-direction, the registration marks 170 are not printed at their theoretical positions. Accordingly, when measuring the center-point distances Lkk, Lyy, Lmm, and Lcc between the center points of two registration marks printed in like colors but slanted in opposite directions (i.e., the registration marks 170K, 170Y, 170M, and 170C of like colors), the values of the center-point distances Lyy, Lmm, and Lcc will deviate from the center-point distance Lkk for black.

Since the amount of deviation in the center-point distances Lyy, Lmm, and Lcc relative to the center-point distance Lkk is proportional to the amount of offset in printed positions for the non-black registration marks 170Y, 170M, and 170C of each color relative to the black registration mark 170K in the Y-direction, it is possible to minimize offset in printed positions for each color in the Y-direction by adjusting the printed position for each color so as to reduce this error.

4. Registration Mark Measurement Error by Mark Sensors

The mark sensors 80 read registration marks 170 that the image-forming unit 5 prints on the belt 34. As shown in FIG. 3, each mark sensor 80 includes a light-emitting element 81, and a light-receiving element 85. The light-emitting element 81 is configured of an LED, for example, and the light-receiving element 85 is configured of a phototransistor, for example.

In each mark sensor 80, the light-emitting element 81 and light-receiving element 85 are mounted adjacent to each other in the Y-direction and are arranged such that their optical axis is angled relative to the surface of the belt 34. The light-emitting element 81 emits light toward an exposure position Q on the surface of the circulating belt 34, and the light-receiving element 85 receives light reflected off the belt 34. The light-receiving element 85 outputs a light-reception signal Sr corresponding to the intensity of received light.

A detection line LQ is defined as a line passing through the exposure position Q and extending in the X-direction (belt moving direction). Because two mark sensors 80 are disposed side by side in the Y-direction on the surface of the belt 34, two exposure positions Q are defined on the surface of the belt 34 as being arranged side by side in the Y-direction, and two detection lines LQ are defined on the surface of the belt 34 as being arranged side by side in the Y-direction. The registration marks 170 are formed as being arranged along the detection lines LQ so that the registration marks 170 are detected by the mark sensors 80 when the registration marks 170 reach the exposure positions Q in accordance with movement of the belt 34 in the X-direction.

In the present embodiment, a comparator (not shown) compares the light-reception signal Sr acquired when the mark sensor 80 reads a registration mark 170 to a threshold value. The control unit 100 detects the center of the registration mark 170 by determining the center of a range F (see FIG. 4) in which the light-reception signal Sr is lower than the threshold value.

5. Registration Mark Measurement Error Due to Variations in Detection Properties of the Mark Sensors For registration marks printed in non-black colors (i.e., cyan, magenta, or yellow), light emitted from the light-emitting element 81 is reflected diffusely off the registration marks, but is reflected specularly in exposed areas of the belt surface around the registration marks. Consequently, the light-reception signal Sr outputted from the mark sensor 80 for a cyan, magenta, or yellow registration mark 170 has a composite waveform from a combination of a diffuse reflection component for light reflected diffusely off the surface of the registration mark, and a specular reflection component for light reflected specularly off the surface of the belt. The belt 34 reflects light specularly because its surface has been treated to produce a mirror finish.

Figure 4:
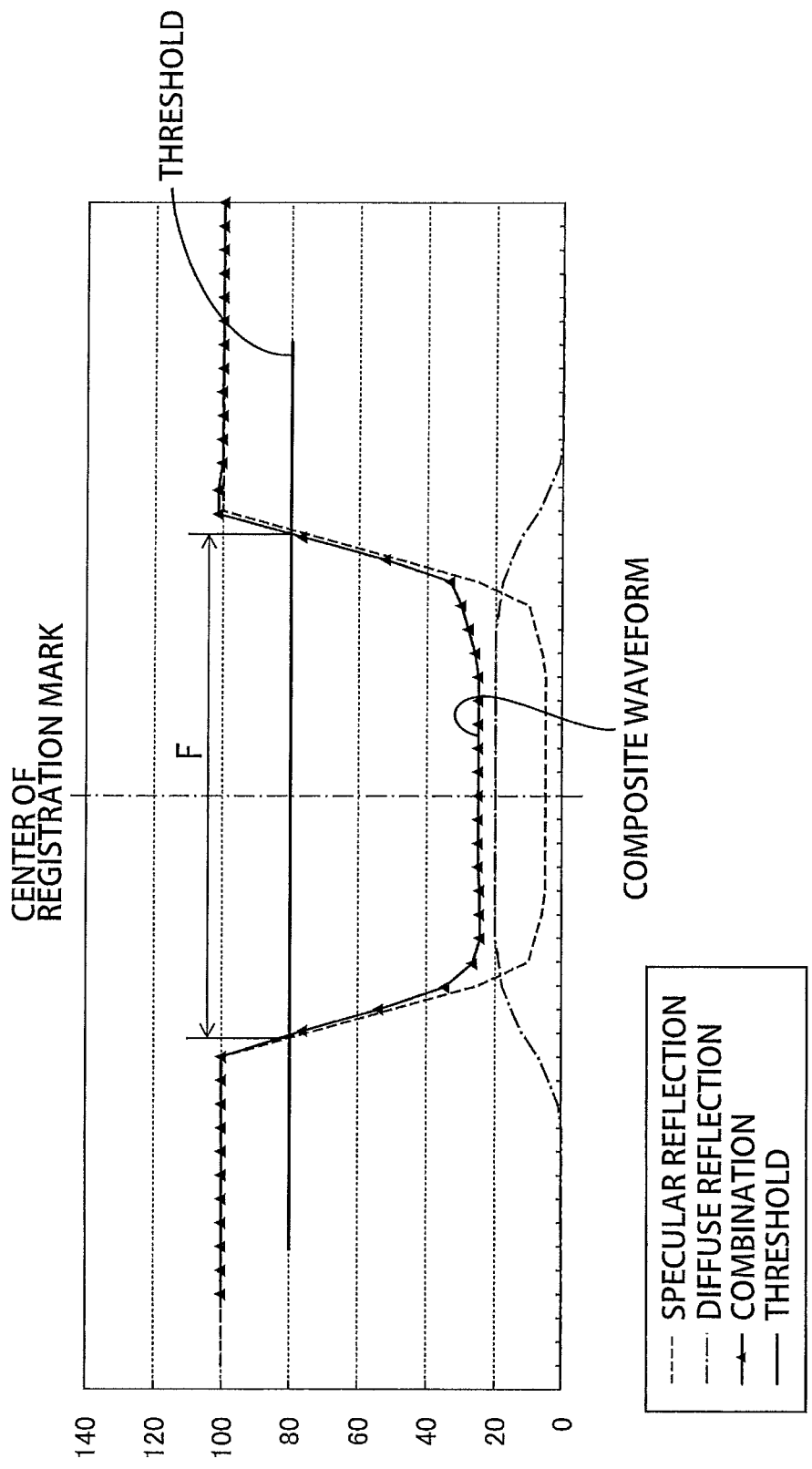
FIG. 4 illustrates a waveform of light received by a light-receiving element when the optical axis of a light-emitting element is aligned at a proper angle.

When the mark sensor 80 is oriented such that its optical axis is aligned at the proper angle, as shown in FIG. 4, the specular reflection component and the diffuse reflection component will produce waveforms that are symmetrical about the center of the registration mark 170 in the left-right direction in FIG. 4, that is, the center of the registration mark 170 in the X-direction. Consequently, the light-reception signal Sr will have a waveform that is symmetrical about the center of the registration mark 170 in the left-right direction of FIG. 4 (center of the registration mark 170 in the X-direction).

Figure 5:
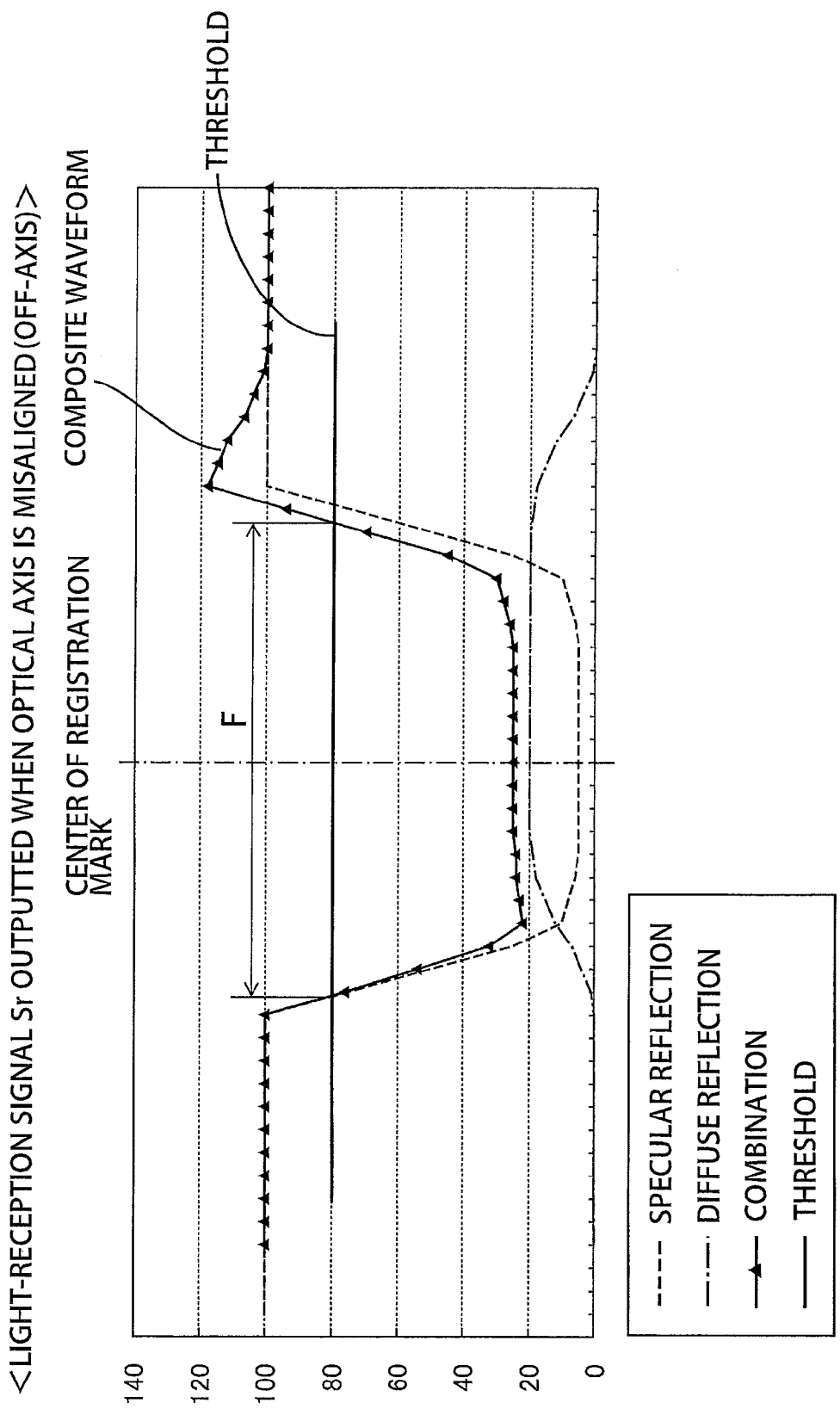
FIG. 5 illustrates a waveform of light received by the light-receiving element when the optical axis of the light-emitting element is misaligned.

However, if the optical axis of the light-emitting element 81 in the mark sensor 80 deviates from its proper angle (i.e., is "off-axis"), as shown in FIG. 5, the specular reflection component will produce a waveform that is symmetrical about the center of the registration mark 170 in the left-right direction in FIG. 5, but the diffuse reflection component will produce a waveform offset from the center of the registration mark 170 (offset to the right in FIG. 5), for the following reason.

Figure 6:
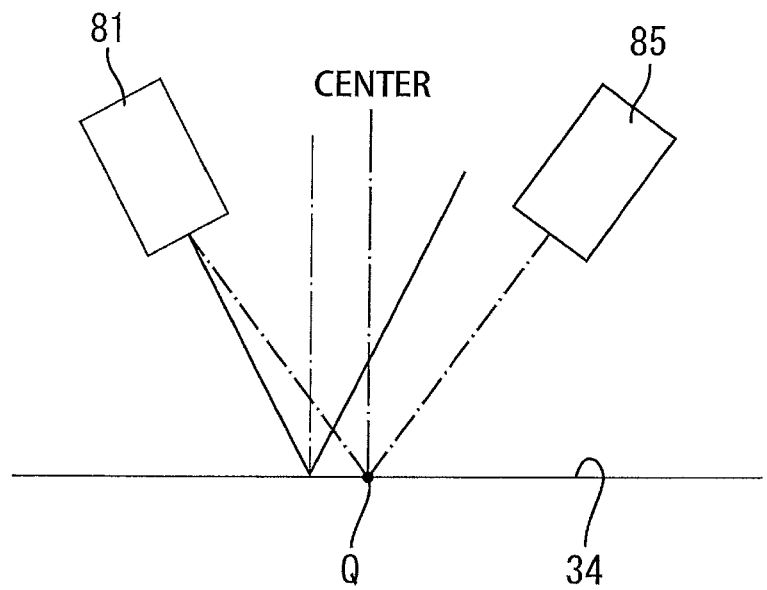
FIG. 6 illustrates relationship between the light-receiving element and a specular reflection light reflected off the surface of the belt.

When the optical axis of the light-emitting element 81 deviates from its proper angle, light along the center of the optical axis is specularly reflected off the belt 34 at a position offset from the exposure position Q (see FIG. 3), as indicated by the solid line in FIG. 6. Consequently, the specularly reflected light misses the light-receiving element 85 and is thus not received. In other words, the only specularly reflected component of light received by the light-receiving element 85 is from light incident on the exposure position Q. Therefore, the waveform for the specular reflection component is symmetrical about the center of the registration mark 170 in the left-right direction in FIG. 5 (center of the registration mark 170 in the X-direction), regardless of whether the light-emitting element 81 is off-axis.

Figure 7:
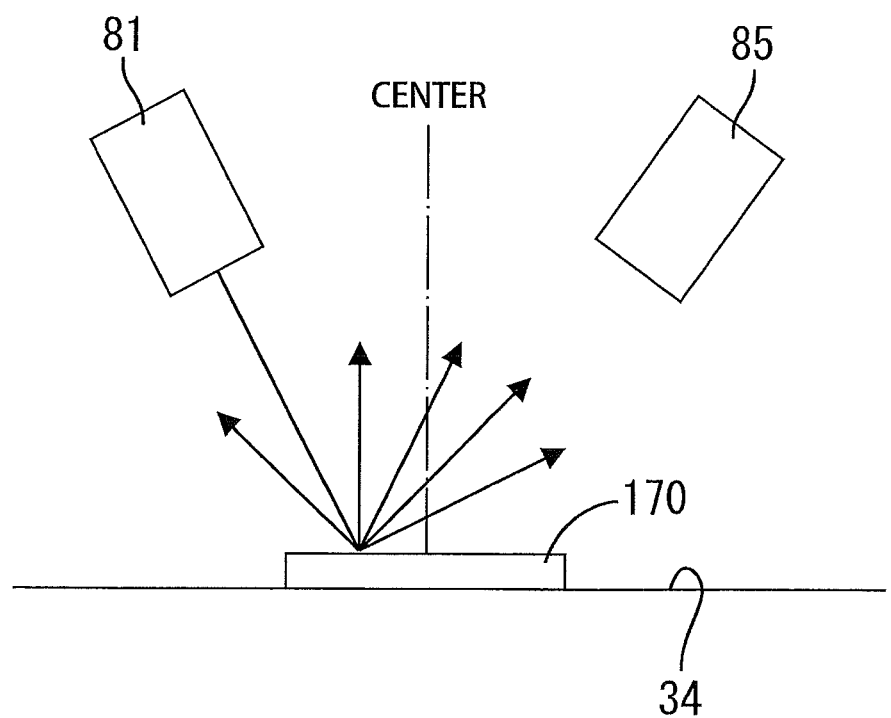
FIG. 7 illustrates relationship between the light-receiving element and a diffuse reflection light reflected off the registration mark.

On the other hand, since the light in the center of the optical axis of the light-emitting element 81 is incident on the belt 34 at a position offset from the exposure position Q when the light-emitting element 81 is off-axis, the quantity of diffusely reflected light is greatest in that region, as shown in FIG. 7. Consequently, there is a bias in the distribution of diffusely reflected light, and the diffuse reflection component received by the light-receiving element 85 produces a waveform that is offset from the center of the registration mark.

Therefore, when the light-emitting element 81 is off-axis, as shown in FIG. 5, the light-reception signal Sr for the non-black registration marks 170C, 170M, and 170Y has a waveform produced by a combination of the specular reflection component, which is symmetrical about the center of the registration mark 170 in the left-right direction in FIG. 5, and the asymmetrical diffuse reflection component. As a result, the composite waveform is asymmetrical about the center of the registration mark 170. In this case, the center of the range F in which the light-reception signal Sr falls below the threshold value is offset from the center of the registration mark 170.

With the registration mark 170 formed of black toner, almost no diffuse reflection occurs because most of the light is absorbed by the registration mark. Therefore, the light-reception signal Sr received by the light-receiving element 85 of the mark sensor 80 for light irradiated onto the black registration mark 170K has the waveform of the specular reflection component for light specularly reflected off the surface of the belt 34 and is affected little by the deviation of the optical axis of the emitted light. In this case, the center of the range F in which the light-reception signal Sr drops below the threshold value closely matches the center of the registration mark 170 despite any deviation in the optical axis.

As a result, the detection properties of the mark sensor 80 differ between the black registration mark 170K and the non-black registration marks 170Y, 170M, and 170C. More specifically, these detection properties differ when the optical axis of the light-emitting element 81 deviates from its proper axis. Consequently, measurement error Ux and Uy in the X-direction and Y-direction, respectively, is produced due to differences in detection properties of the mark sensor 80 when the optical axis of the mark sensor 80 is misaligned. Here, the measurement error Ux is error in the center-point distances Lky, Lkm, and Lkc measured by the mark sensor 80 relative to the actual center-point distances Lky, Lkm, and Lkc, while the measurement error Uy is error in the center-point distances Lyy, Lmm, and Lcc measured by the mark sensor 80 relative to the actual center-point distances Lyy, Lmm, and Lcc.

6. Description of Error Detection Marks

As described above, measurement error Ux and Uy of the registration mark 170 are produced from offset in the diffuse reflection component caused by misalignment of the optical axis. In the present embodiment, error detection marks 200 described below are used to detect offset in the diffuse reflection component in order to determine measurement error Ux and Uy for the registration mark 170.

Figure 8:
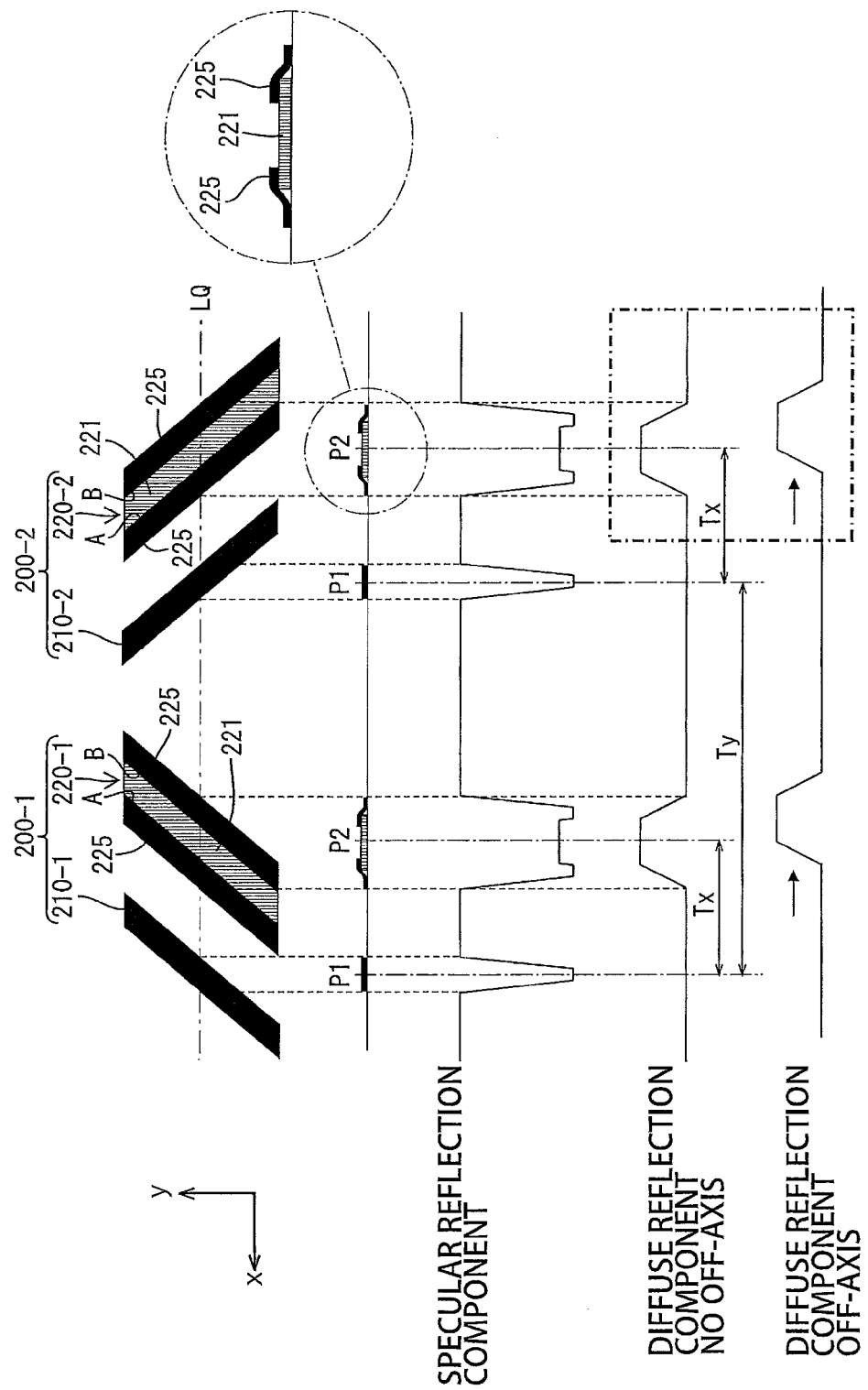
FIG. 8 illustrates relationship between error detection marks and waveforms of respective components in the received light.

As shown in FIGS. 8 and 9, the error detection marks 200 are images that the image-forming unit 5 prints on the belt 34 along the detection lines LQ. Each error detection mark 200 includes a first mark 210, and a second mark 220. The first mark 210 is printed in black toner. The first mark 210 is a single line that is slanted relative to the X-direction and that has a fixed width in the X-direction. The second mark 220 is formed so that the first and second marks 210 and 220 are apart from each other by a fixed distance in the X-direction. The second mark 220 includes a main mark part 221 and mask parts 225.

As with the first mark 210, the main mark part 221 is a line that is slanted relative to the X-direction and that has a fixed width in the X-direction. However, the main mark part 221 is printed using yellow toner, which has a higher diffuse reflectance than black toner. The main mark part 221 is printed wider than the desired line width.

The mask parts 225 are printed on left and right sides of the main mark part 221 in FIGS. 8 and 9, that is, on upstream and downstream sides of the main mark part 221 in the X-direction. The mask parts 225 are printed using black toner. Specifically, the mask parts 225 are printed over excess portions of the main mark part 221 extending beyond the desired line width in the X-direction. Thus, the mask parts 225 cover both edges of the main mark part 221 relative to the X-direction so that only a portion of the main mark part 221 having the desired line width is exposed.

As shown in FIGS. 8 and 9, a pair of the first marks 210 and a pair of the second marks 220 are formed along the detection line LQ for each mark sensor 80. Each pair includes a positive direction mark that is slanted at a positive angle to the X-direction and a negative direction mark that is slanted at a negative angle to the X-direction. Thus, two first marks 210-1 and 210-2 are formed to be nonparallel and spaced a distance P in the X-direction. Similarly, two second marks 220-1 and 220-2 are formed to be nonparallel and spaced at the distance P in the X-direction. In FIGS. 8 and 9, the notations "-1" and "-2" are appended to reference numerals of the error detection marks 200 and its components to indicate their different slanted orientations. Further, the distance P between the first marks 210 is equal to the distance P between the second marks 220.

The distance between the first mark 210 and second mark 220 in the X-direction is preferably set based on the rotational period of the drive roller 31 driving the belt 34 or the rotational period of the photosensitive drums 41. That is, the distance between the first mark 210 and second mark 220 in the X-direction is preferably set to an integer multiple of the circumference of the drive roller 31 or the circumference of photosensitive drums 41. This method improves the precision in positioning the first mark 210 and second mark 220 in the X-direction without the distance between the two marks being affected by cyclical fluctuations in the drive roller 31 and photosensitive drums 41. For the same reason, the distance between the first marks 210-1 and 210-2 in the X-direction and the distance between the second marks 220-1 and 220-2 in the X-direction are preferably set based on the rotational period of the drive roller 31 or the rotational period of the photosensitive drums 41.

Using data read by the mark sensor 80 for the error detection marks 200 printed on the belt 34, the printer 1 detects a center-point distance Lx between a center point P1 of the first mark 210 and a center point P2 of the second mark 220 (see FIG. 9). The center point P1 of the first mark 210 is the central position in the X-direction between the upstream and downstream edges of the first mark 210 that pass through the exposure position Q. In this example, the first mark 210 is a single line. Therefore, the outline of the first mark 210 on the right side in FIG. 9 is the upstream edge, and the outline of the first mark 210 on the left side is the downstream edge. The center position between these two edges in the X-direction (i.e., the center of the first mark 210 relative to the X-direction) is the center point P1. The center point P2 of the second mark 220 is the center position in the X-direction between sides A and B of the second mark 220 formed on the main mark part 221 that pass through the exposure position Q (see FIGS. 8 and 9). The center-point distance Lx can be calculated by multiplying the velocity V of the belt 34 by a detection interval Tx of the light-reception signal Sr (Lx=V×Tx).

When the mark sensor 80 reads the error detection marks 200 formed on the belt 34, emitted light is absorbed in regions of the belt 34 corresponding to the first marks 210 so that the amount of received light is nearly zero. In the region of the belt 34 corresponding to the second mark 220, light is reflected diffusely by the main mark part 221 and absorbed by the mask parts 225. Therefore, the mark sensor 80 only receives the diffuse reflection component and not the specular reflection component.

When the optical axis of the light-emitting element 81 is shifted in the X-direction, the light-reception signal for the second mark 220 from which only the diffuse reflection component is received is shifted in the X-direction from the center of the mark. Therefore, the center-point distance Lx increases or decreases relative to the theoretical value, the amount of increase or decrease growing in proportion to the magnitude of the off-axis angle.

The printer 1 is provided with a conversion table (upper side in FIG. 10) for converting a difference ΔLx between the center-point distance Lx and its theoretical value to the measurement error Ux for the X-direction. The conversion table is previously stored in the ROM 130. Hence, using data produced by the mark sensor 80 when reading the error detection marks 200, the control unit 100 of the printer 1 calculates the center-point distance Lx between the first mark 210 and second mark 220 and compares this center-point distance Lx to its theoretical value to find the difference ΔLx. After finding the difference ΔLx, the control unit 100 references the conversion table to determine the measurement error Ux in the X-direction.

Based on data produced by the mark sensor 80 when reading the error detection marks 200 printed on the belt 34, the control unit 100 detects center points P11 and P12 of the respective first marks 210-1 and 210-2 and calculates a center-point distance Ly1 between these center points P11 and P12. Similarly, the control unit 100 detects center points P21 and P22 of respective second marks 220-1 and 220-2 and calculates a center-point distance Ly2 between these center points P21 and P22. The center points P11 and P12 denote center positions of the first marks 210-1 and 210-2, respectively, in the X-direction. The center points P21 and P22 of the respective second marks 220-1 and 220-2 denote the center positions in the X-direction between the two sides A and B formed over the main mark part 221 of the respective second marks 220-1 and 220-2 that pass through the exposure position Q.

When the optical axis of the light-emitting element 81 is offset in the Y-direction, the center-point distance Ly2 between the second marks 220 increases or decreases relative to the center-point distance Ly1 between the first marks 210 based on the off-axis angle.

The printer 1 is provided with a conversion table (lower side in FIG. 10) for converting a difference ΔLy between the center-point distance Ly2 and the center-point distance Ly1 to the measurement error Uy for the Y-direction. This conversion table is previously stored in the ROM 130. By finding this difference ΔLy, the control unit 100 can reference the conversion table to determine the measurement error Uy for the Y-direction. The center-point distances Ly can be calculated by multiplying the velocity V of the belt 34 by a detection interval Ty of the light-reception signal Sr (Ly=V×Ty).

FIG. 10 shows examples of the conversion table for the X-direction (upper side in FIG. 10) and the conversion table for the Y-direction (lower side in FIG. 10). The conversion table for the X-direction stores correlations between differences ΔLx between the center-point distance Lx and its theoretical value and measurement error Ux for the registration mark 170 measured by the mark sensor 80 for various off-axis angles. By looking up the difference ΔLx in the conversion table for the X-direction, the control unit 100 can determine the measurement error Ux for the registration mark 170 measured by the mark sensor 80. Similarly, the conversion table for the Y-direction stores correlations between differences ΔLy between the center-point distances Ly1 and Ly2 and measurement error Uy for the registration mark 170 measured by the mark sensor 80 for various off-axis angles. By looking up the difference ΔLy in this conversion table, the control unit 100 can determine the measurement error Uy for the registration mark 170 measured by the mark sensor 80.

The conversion tables described above may be created by experimentally reading registration marks 170 and error detection marks 200 formed on the belt 34 with the mark sensors 80 while varying the off-axis angle of the light-emitting elements 81 and by subsequently correlating the measurement error Ux and Uy obtained from reading results for the registration marks 170 with differences ΔLx and ΔLy obtained from reading results for the error detection marks 200.

In addition, the magnitudes of measurement error Ux and Uy for the registration marks 170 are influenced by the light reflectance of the belt surface. Specifically, when the belt surface has low reflectance, the level of the light-reception signal will not be greater than or equal to a prescribed permissible minimum value, unless the intensity of emitted light is increased. If the level of the light-reception signal is smaller than the permissible minimum value, the registration marks 170 cannot be accurately detected based on the light-reception signal. So, when the belt surface has low reflectance, the intensity of the emitted light has to be increased. This increases the ratio of the diffuse reflection component relative to the total amount of the reflected light. Consequently, a noticeable shift is produced in the light-reception signal Sr from the center of the registration mark 170, leading to larger measurement error Ux and Uy for the registration marks 170. On the other hand, if the belt surface has a high reflectance, the intensity of emitted light has to be reduced, lowering the ratio of the diffuse reflection component relative to the total amount of the reflected light. Consequently, shift in the light-reception signal Sr is reduced, producing much less measurement error Ux and Uy for the registration mark 170. As shown in FIG. 10, each conversion table in the present embodiment is provided with a plurality of sections corresponding to a plurality of different values for light reflectance of the belt surface which are set in a stepwise manner. By applying a section of the conversion table corresponding to the light reflectance, the control unit 100 can more accurately determine the measurement error Ux and Uy of the registration marks. Here, light reflectance may be computed from the ratio of emitted light intensity to received light intensity, for example.

7. Color Registration Correction Process

Figure 11:
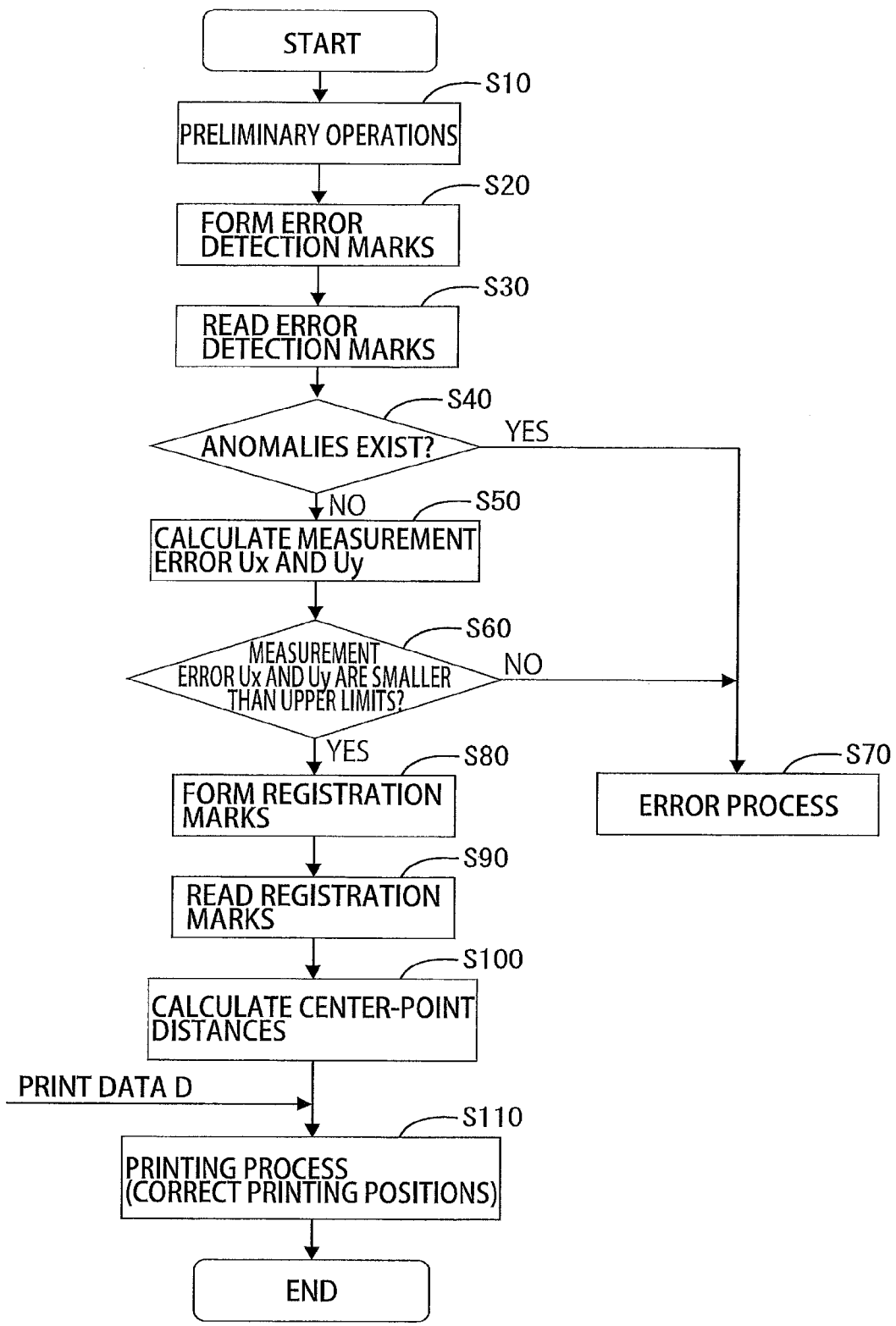
FIG. 11 is a flowchart showing the sequence of steps in a color registration correction process.

Color registration correction is a process performed to reduce offset in printing positions of all colors relative to black. FIG. 11 shows the sequence of steps in the color registration correction process executed by the control unit 100 when the belt 34 or process units 40 are replaced, for example.

In S10 at the beginning of the process in FIG. 11, the control unit 100 performs preliminary operations for the printer 1. The preliminary operations include rotating the main motor 71 in order to drive the belt 34 and various rotary bodies including the photosensitive drums 41.

In S20 the control unit 100 controls the image-forming unit 5 to print the error detection marks 200 on the circulating belt 34. After printing the error detection marks 200, in S30 the control unit 100 performs a process to read the error detection marks 200 using the mark sensors 80. Specifically, the mark sensors 80 read the error detection marks 200 and input the read data into the control unit 100. In S40 the control unit 100 verifies that there are no anomalies in the number of error detection marks 200 or the like printed. If the number of marks is abnormal (S40: Yes), the control unit 100 executes an error process in S70.

If the control unit 100 finds no anomalies in the number of error detection marks 200 and the like (S40: No), in S50 the control unit 100 determines the measurement error Ux and Uy of the registration marks 170 read with the mark sensors 80 based on the read data for the error detection marks 200. Specifically, the control unit 100 determines the center-point distance Lx between the first mark 210 and second mark 220 from the read data for the error detection mark 200, then compares the calculated center-point distance Lx with a theoretical value to find the difference ΔLx. Next, the control unit 100 looks up the difference ΔLx in the conversion table to determine the measurement error Ux for the registration marks 170.

The control unit 100 similarly determines the center-point distance Ly1 for the first marks and the center-point distance Ly2 for the second marks from the read data for the error detection marks 200. After finding the difference ΔLy between the center-point distances Ly1 and Ly2, the control unit 100 looks up the difference ΔLy in the conversion table to determine the measurement error Uy for the registration marks 170. In this manner, the control unit 100 determines the measurement error Ux and Uy of the mark sensors 80 for the registration marks 170.

In S60 the control unit 100 compares the measurement error Ux and Uy calculated in S50 to respective upper limits. If either of the measurement error Ux or Uy of any mark sensor 80 is higher than or equal to its upper limit, the control unit 100 reaches a NO determination in S60. In this case, the control unit 100 advances to S70 and executes the error process (i.e., determines that an anomaly has occurred in the mark sensors). So, it is possible to prevent such a mark sensor 80 whose measurement error is too high from being used in the printer 1.

If both the measurement error Ux and Uy are less than their upper limits (S60: YES), then the control unit 100 stores the measurement error Ux and Uy calculated in S50 in the RAM 120 and advances to S80. In S80 the control unit 100 controls the image-forming unit 5 to print the registration marks 170 on the circulating belt 34.

After the registration marks 170 are printed, in S90 the control unit 100 reads the registration marks 170 using the mark sensors 80. Specifically, the mark sensors 80 read the registration marks 170 and output the read data to the control unit 100.

In S100 the control unit 100 calculates the center-point distances Lky, Lkm, and Lkc between the black registration mark 170K and the non-black registration marks 170Y, 170M, and 170C based on the read data received from the mark sensors 80. Similarly, the control unit 100 calculates the center-point distances Lkk, Lyy, Lmm, and Lcc based on the read data for these registration marks 170. Data for the center point distances calculated above is stored in the RAM 120. Subsequently, the printer 1 enters a standby state and waits for a print command.

When the printer 1 receives print data from an information terminal device, such as a PC, the control unit 100 of the printer 1 executes a printing process for forming images on sheets 15 based on the print data. At this time, in S110 the control unit 100 of the printer 1 corrects printing positions in the X-direction and Y-direction based on data for the measurement error Ux and Uy calculated in S50 and data for the center point distances between registration marks calculated in S100 to reduce the misalignment in color registration of cyan, magenta, and yellow relative to black.

Printing Position Correction for the X-Direction

Offset in the X-direction of printing positions for non-black colors based on the printing position of black is proportional to the offset of respective center-point distances Lky, Lkm, and Lkc from their theoretical values. Therefore, the control unit 100 first calculates offsets Δky, Δkm, and Δkc of the respective center-point distances Lky, Lkm, and Lkc relative to their theoretical values. Next, the offsets Δky, Δkm, and Δkc calculated above are modified by an amount equivalent to the measurement error Ux calculated in S50. That is, a modification value that is determined by reversing the plus/minus sign of the measurement error Ux is added to the offsets Δky, Δkm, and Δkc, thereby modifying the offsets Δky, Δkm, and Δkc. By adjusting the printing positions for each color by a correction value that is determined to reduce the modified offsets Δky, Δkm, and Δkc, the control unit 100 can minimize offset in the X-direction of the printing positions for each color. Printing positions are corrected by adjusting the exposure start timing of each exposure device 49 by a time proportional to the correction value.

Printing Position Correction for the Y-Direction

Offset in the Y-direction of printing positions for each color based on the printing position of black is proportional to the offset of each of the center-point distances Lyy, Lmm, and Lcc relative to the center-point distance Lkk. Therefore, the control unit 100 first calculates offsets Δyy, Δmm, and Δcc for the center-point distances Lyy, Lmm, and Lcc relative to the center-point distance Lkk. Next, the control unit 100 modifies the offsets Δyy, Δmin, and Δcc calculated above by an amount equivalent to the measurement error Uy calculated in S50. That is, the control unit 100 modifies the offsets Δyy, Δmm, and Δcc by adding a modification value that is obtained by reversing the plus/minus sign of the measurement error Uy. By adjusting the printing position for each color by a correction value that is determined to reduce the modified offsets Δyy, Δmm, and Δcc, it is possible to minimize printing position offset in the Y-direction for each color. Printing positions are corrected by adjusting the exposure start timing of each exposure device 49 by a time proportional to the correction value.

8. Effects of the First Embodiment

The printer 1 according to the first embodiment detects the measurement error Ux and Uy for registration marks 170 measured by the mark sensors 80 and incorporates this data in calculations of correction values for correcting color registration. Using this measurement error data can improve precision in color registration correction.

The printer 1 finds the measurement error Ux and Uy for registration marks 170 measured by the mark sensors 80 by detecting offset in the center of the diffuse reflection component. Consequently, offset in the center of the diffuse reflection component has to be found accurately from the light-reception signal Sr in order to find the accurate measurement error Ux and Uy for the registration marks 170.

The printer 1 prints the mask parts 225 on both sides of the main mark part 221 for this purpose. If the mask parts 225 are not printed on the sides of the main mark part 221, the highly reflective belt surface exposed on both sides of the main mark part 221 would reflect light specularly. This specular reflection could interfere with an accurate detection of the center of the diffuse reflection component corresponding to the mark center since the light-reception signal Sr corresponding to the main mark part 221 has a waveform combining the diffuse reflection component for light reflected diffusely off the main mark part 221 and the specular reflection component for light reflected specularly off the belt surface on both sides of the main mark part 221.

However, according to the first embodiment, the mask parts 225 are provided on both sides of the main mark part 221. So, light irradiated on the sides of the main mark part 221 are absorbed by the mask parts 225 and not reflected specularly. Therefore, the light-reception signal corresponding to the main mark part 221 includes only the diffuse reflection component for light reflected diffusely off the main mark part 221, allowing the center of the diffuse reflection component to be detected accurately.

Further, each error detection mark 200 in the first embodiment is configured of the first mark 210 serving as the reference side of the error detection mark 200, and the second mark 220 for detecting offset in the center of the diffuse reflection light. Therefore, the center-point distance Lx will change if the relative positions of the first mark 210 and second mark 220 deviate, making it impossible to accurately measure offset in the center of the diffuse reflection component.

In this respect, it is noted that different process units are used for printing the first mark 210 and the main mark part 221 of the second mark 220. That is, the first mark 210 is printed in black toner, while the main mark part 221 of the second mark 220 is printed in yellow toner. So, if the second mark 220 is made up from the main mark part 221 only, it will be difficult to achieve sufficient precision in the relative position between the second mark 220 and first mark 210.

For this reason, the printer 1 according to the first embodiment prints the main mark part 221 thicker than the desired line width and prints the mask parts 225 over the extra portion of the main mark part 221 extending beyond the desired line width.

In other words, the outline of the main mark part 221 exposed is determined by the mask parts 225, which are printed in the same black toner used to print the first mark 210. In this case, the relative position of the second mark 220 to the first mark 210 can be set with precision. Accordingly, the printer 1 can accurately calculate the center of the diffuse reflection component and, hence, the measurement error Ux and Uy of the registration marks 170 measured by the mark sensors 80.

In order to detect the measurement error Ux and Uy for the registration marks 170, it is unnecessary to measure the amount of distortion in the detection wave generated from the registration marks 170. The measurement error Ux and Uy for the registration marks 170 can be determined more easily by measuring the light-reception signal Sr from the error detection marks 200.

In the present embodiment, the first mark 210 is configured of a single line. So, the amount of black toner used to form the first mark 210 can be made small.

The process unit 40Y is upstream in the X-direction (belt moving direction) of the process unit 40K. So, the main mark part 221 and the mask parts 225 are formed in this order. So, the mask parts 225 can be easily provided superposed on the main mark part 221.

Second Embodiment

Figure 12:
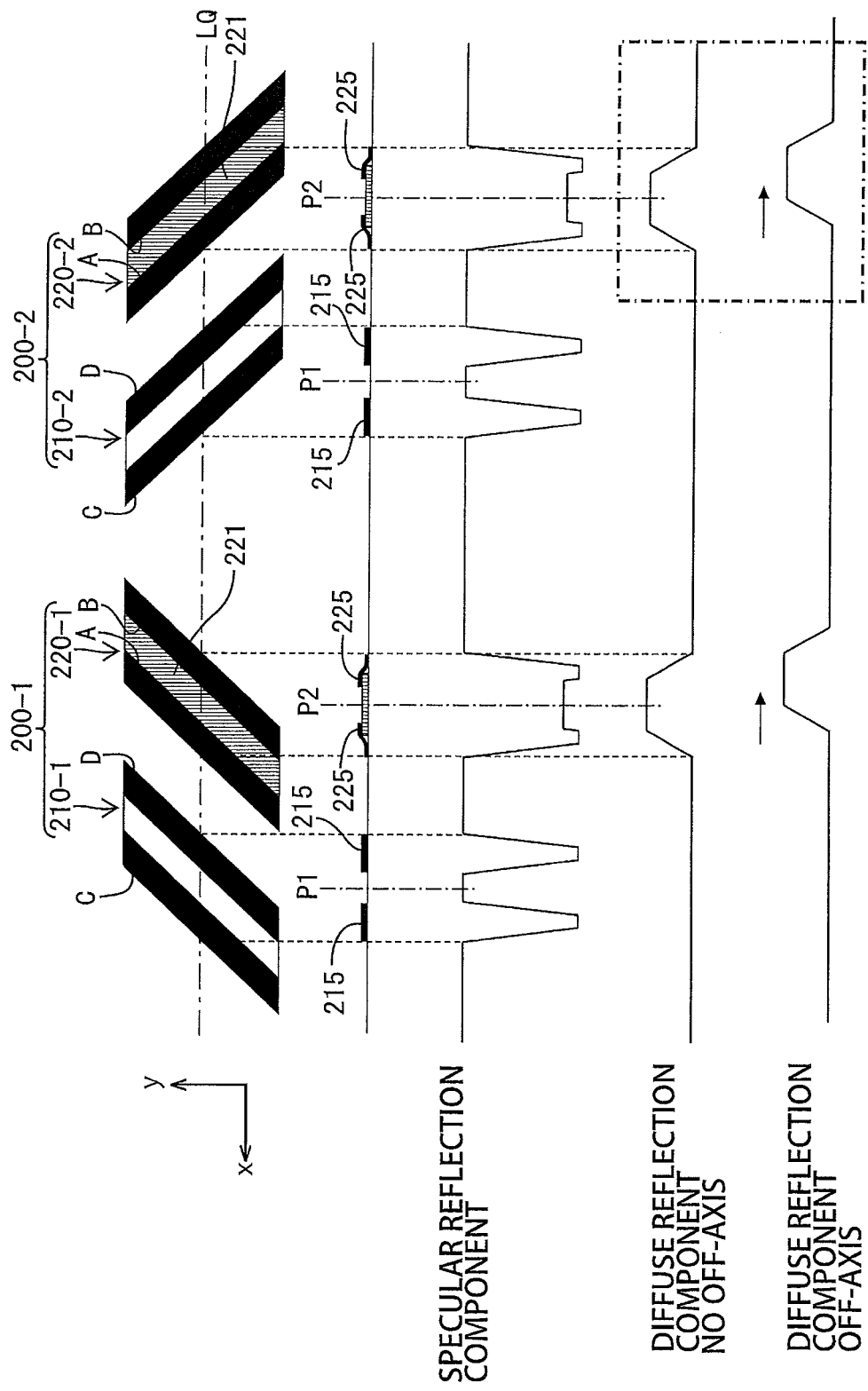
FIG. 12 illustrates relationship between error detection marks and waveforms of respective components in the received light according to a second embodiment.

Next, a second embodiment of the invention will be described with reference to FIG. 12. In the second embodiment, the structure of the error detection mark 200 is partially modified from that described in the first embodiment. That is, the first mark 210 of the error detection mark 200 in the first embodiment is configured of a single line. However, in the second embodiment, the first mark 210 is configured of two lines 215 formed at an interval equal to the interval between the mask parts 225 printed on both sides of the main mark part 221.

The method of the second embodiment is conductive to achieving good precision in the relative positions of the first mark 210 and second mark 220 since the interval between the lines 215 of the first mark 210 is set equivalent to the interval between the mask parts 225 of the second mark 220. In this example, the center point P1 of the first mark 210 denotes the center position in the X-direction between an upstream side D and a downstream side C of the first mark 210, both of which pass through the exposure position Q. As in the first embodiment, the center point P2 of the second mark 220 denotes the center position in the X-direction between the sides A and B of the second mark 220 formed over the main mark part 221 that pass through the exposure position Q.

Third Embodiment

Figure 13:
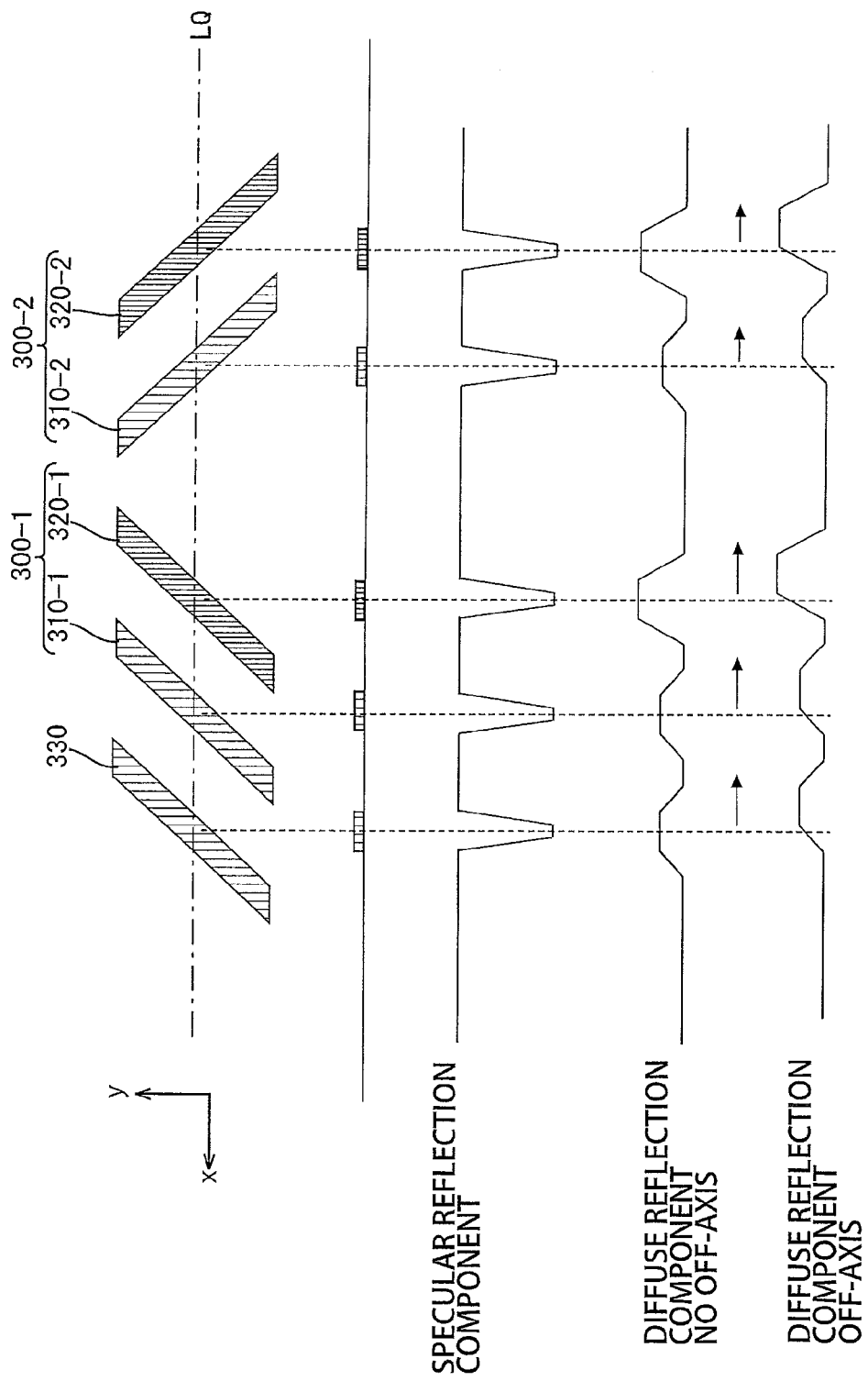
FIG. 13 illustrates relationship between error detection marks and waveforms of respective components in the received light according to a third embodiment.

Next, a third embodiment of the invention will be described with reference to FIGS. 13 through 16. In the third embodiment, the structure of the error detection mark 200 is modified from that in the first embodiment. FIG. 13 shows error detection marks 300 according to the third embodiment. Each error detection mark 300 is configured of a first mark 310, and a second mark 320. A reference mark 330 is also provided in each error detection mark 300.

The first mark 310 and second mark 320 are printed using yellow toner, which has a higher diffuse reflectance than black toner. The first mark 310 and second mark 320 are formed at a slant to the X-direction and are spaced apart a fixed interval in the X-direction, which is the direction that the belt 34 moves. The first mark 310 and second mark 320 are also formed at different toner densities, with the first mark 310 having a lower density than the second mark 320. Since the magnitude of toner density is related to the magnitude of the diffuse reflection component, the first mark 310 and second mark 320 can be made to have different diffuse reflection components through their different densities. Here, "toner density" denotes the amount of toner deposited per unit area and can be modified by adjusting the value of the developing voltage applied to the developing roller or by adjusting the amount of exposure.

Figure 14:
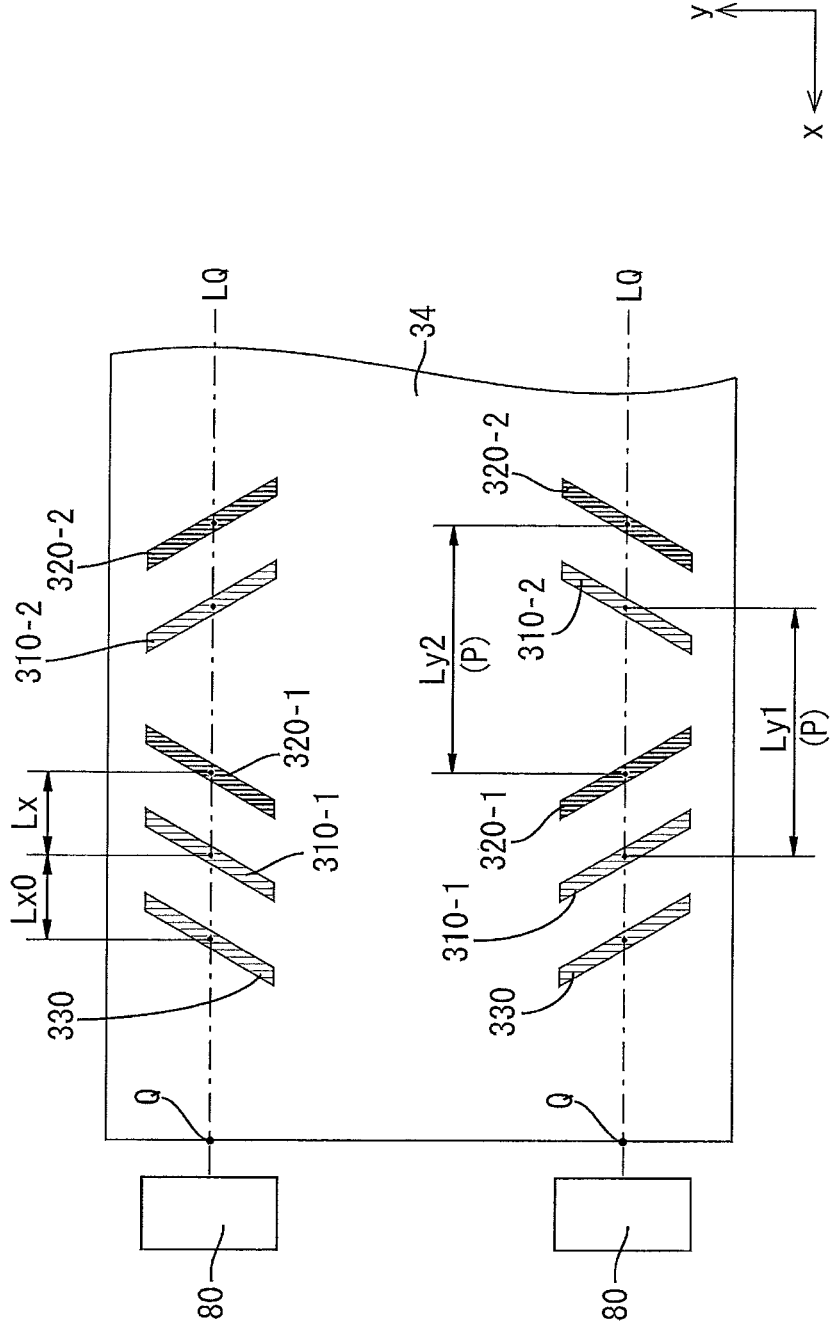
FIG. 14 is a plan view of the belt printed with error detection marks according to the third embodiment.

As shown in FIG. 14, a pair of the first marks 310 and a pair of the second marks 320 are formed along the detection line LQ for each mark sensor 80. Each pair include a positive-direction mark that is slanted at a positive angle to the X-direction, and a negative-direction mark that is slanted at a negative angle. Thus, two first marks 310-1 and 310-2 are formed to be nonparallel and spaced a distance P in the X-direction. Similarly, two second marks 320-1 and 320-2 are formed to be nonparallel and spaced a distance P in the X-direction. In FIGS. 13 and 14, the notations "-1" and "-2" are appended to the reference numerals of the error detection marks 300 and their components to indicate their different slanted orientations. Further, the distance P between the first marks 310 is equal to the distance P between the second marks 320.

The reference mark 330 is formed on the downstream side of the first mark 310-1. The reference mark 330 is printed in yellow toner at the same low toner density as the first marks 310. The reference mark 330, first marks 310, and second marks 320 are formed at equal intervals in the X-direction.

Using data read by the mark sensors 80 for the error detection marks 300 printed on the belt 34, the printer 1 according to the third embodiment calculates a reference distance Lx0 between a center point of the reference mark 330 in the X-direction and a center point of the first mark 310 in the X-direction, and calculates the center-point distance Lx between the center point of the first mark 310 in the X-direction and the center point of the second mark 320 in the X-direction, as illustrated in FIG. 14.

Figure 15:
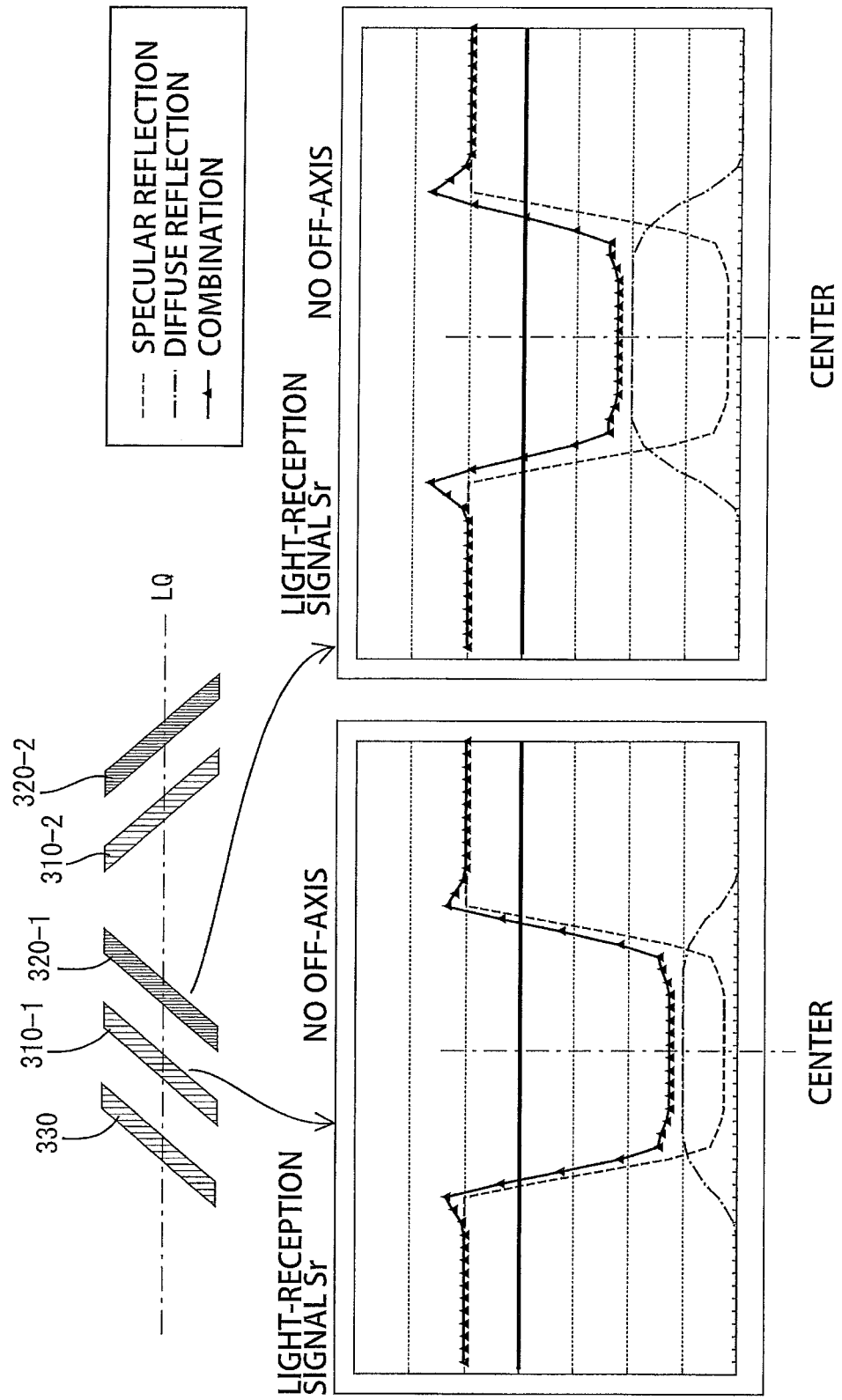
FIG. 15 illustrates waveform of light received from a first mark and waveform of light received from a second mark according to the third embodiment when the optical axis of the light-emitting element is aligned at a proper angle.
Figure 16:
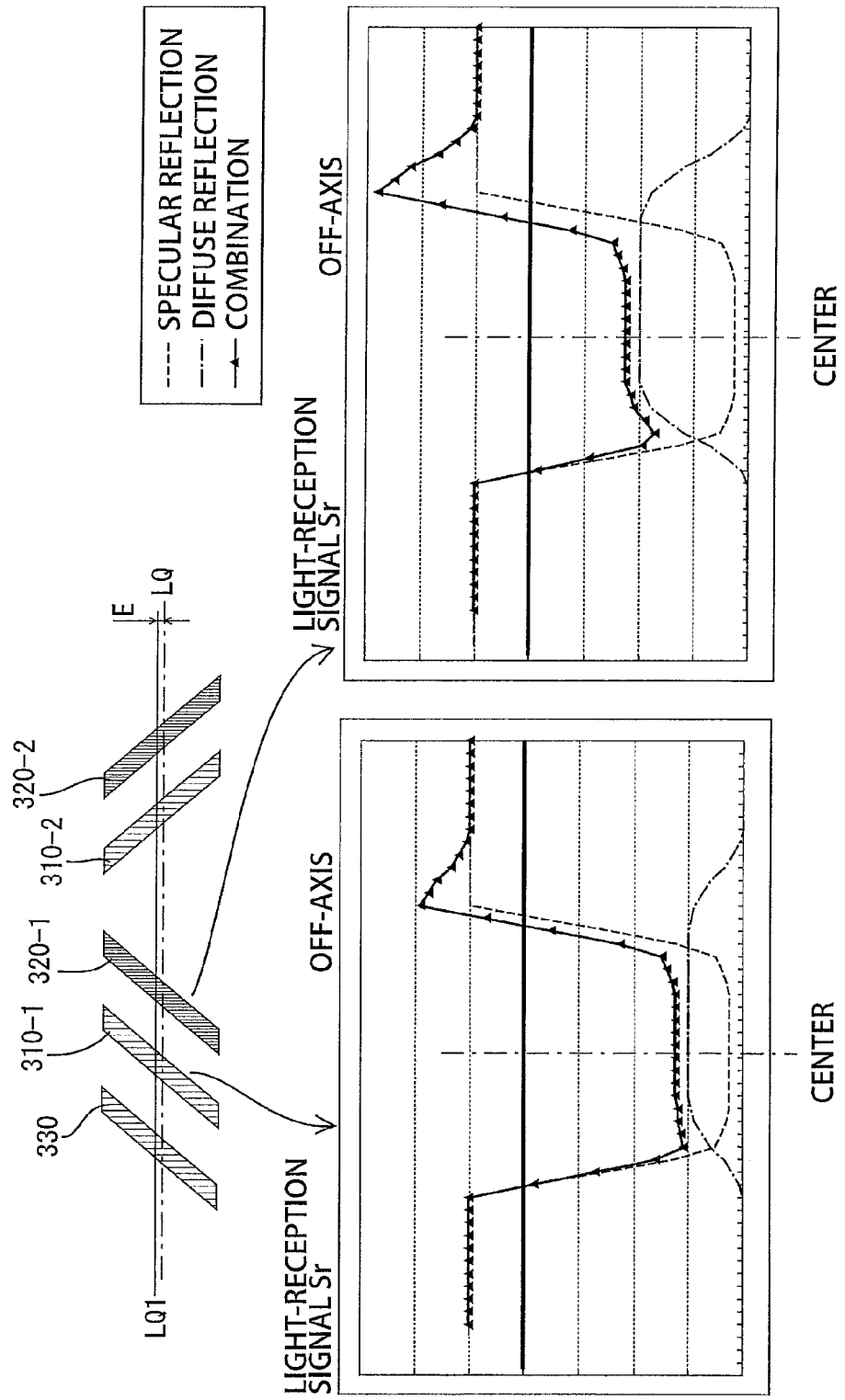
FIG. 16 illustrates waveform of light received from the first mark and waveform of light received from the second mark according to the third embodiment when the optical axis of the light-emitting element is misaligned.

In the third embodiment, the first mark 310 and second mark 320 are formed with different toner densities, producing a difference in magnitude in their diffuse reflection components. As shown in FIGS. 15 and 16, the diffuse reflection component is smaller for the first mark 310 having a low toner density, and larger for the second mark 320 having a high toner density. As a result, the light-reception signals produced at the first mark 310 and second mark 320 have different levels of distortion in their waveforms. When the optical axis of the light-emitting element 81 is offset in the X-direction, the length of the center-point distance Lx varies (increases or decreases) relative to the reference distance Lx0. Hence, by detecting the difference ΔLx between the center-point distance Lx and the reference distance Lx0, the control unit 100 can determine the measurement error Ux for the X-direction produced by the mark sensor 80 due to its off-axis angle.

More specifically, the printer 1 is provided with a conversion table for converting the difference ΔLx between the center-point distance Lx and the reference distance Lx0 to the measurement error Ux for the X-direction. Hence, using data produced by the mark sensor 80 when reading the error detection marks 300, the control unit 100 of the printer 1 calculates the reference distance Lx0 and the center-point distance Lx to find the difference ΔLx. With this difference ΔLx, the control unit 100 references the conversion table to determine the measurement error Ux for the X-direction.

Based on data produced by the mark sensors 80 when reading the error detection marks 300 printed on the belt 34, the control unit 100 in the third embodiment calculates the center-point distance Ly1 between the center point of the first mark 310-1 in the X-direction and the center point of the first mark 310-2 in the X-direction, and the center-point distance Ly2 between the center point of the second mark 320-1 in the X-direction and the center point of the second mark 320-2 in the X-direction, as illustrated in FIG. 14.

Setting different toner densities for the marks as described above produces different magnitudes in the diffuse reflection component, producing a difference in the waveform distortion of the light-reception signals for the first mark 310 and second mark 320. As a result, when the optical axis of the light-emitting element 81 is offset in the Y-direction, the amount of offset E of an actual detection line LQ1 relative to the proper detection line LQ, as shown in FIG. 16, is different between the first mark 310 side and the second mark 320 side. Therefore, the length of the center-point distance Ly2 varies relative to the center-point distance Ly1. Hence, by detecting the difference ΔLy between the center-point distance Ly2 and the center-point distance Ly1, it is possible to determine the measurement error Uy for the Y-direction.

More specifically, the printer 1 is provided with a conversion table for converting the difference ΔLy between the center-point distance Ly2 and the center-point distance Ly1 into the measurement error Uy for the Y-direction. Hence, using the data produced by the mark sensor 80 when reading the error detection marks 300, the control unit 100 of the printer 1 calculates the center-point distances Ly1 and Ly2 to find the difference ΔLy. After finding the difference ΔLy, the control unit 100 references the conversion table to determine the measurement error Uy for the Y-direction.

While the above description gives an example of comparing the center-point distance Lx to the reference distance Lx0, a theoretical value may be used in place of the reference distance Lx0, as in the first embodiment. This method eliminates the need for the reference mark 330. However, a reference mark can be beneficial in finding accurate differences ΔLx and ΔLy because the use of a reference mark is less susceptible to the effects of error caused by cyclical fluctuations in the drive roller 31 and follow roller 32.

Fourth Embodiment

Next, the fourth embodiment of the invention will be described with reference to FIG. 17. In the fourth embodiment, the structure of the error detection mark 300 described in the third embodiment is modified. That is, the first mark 310 and second mark 320 in the third embodiment are printed at different toner densities to produce a difference in the magnitude of their diffuse reflection components. However, the magnitudes of diffuse reflection components for first and second marks are differentiated by forming the marks with different dimensions in the X-direction, i.e., different line widths.

Figure 17:
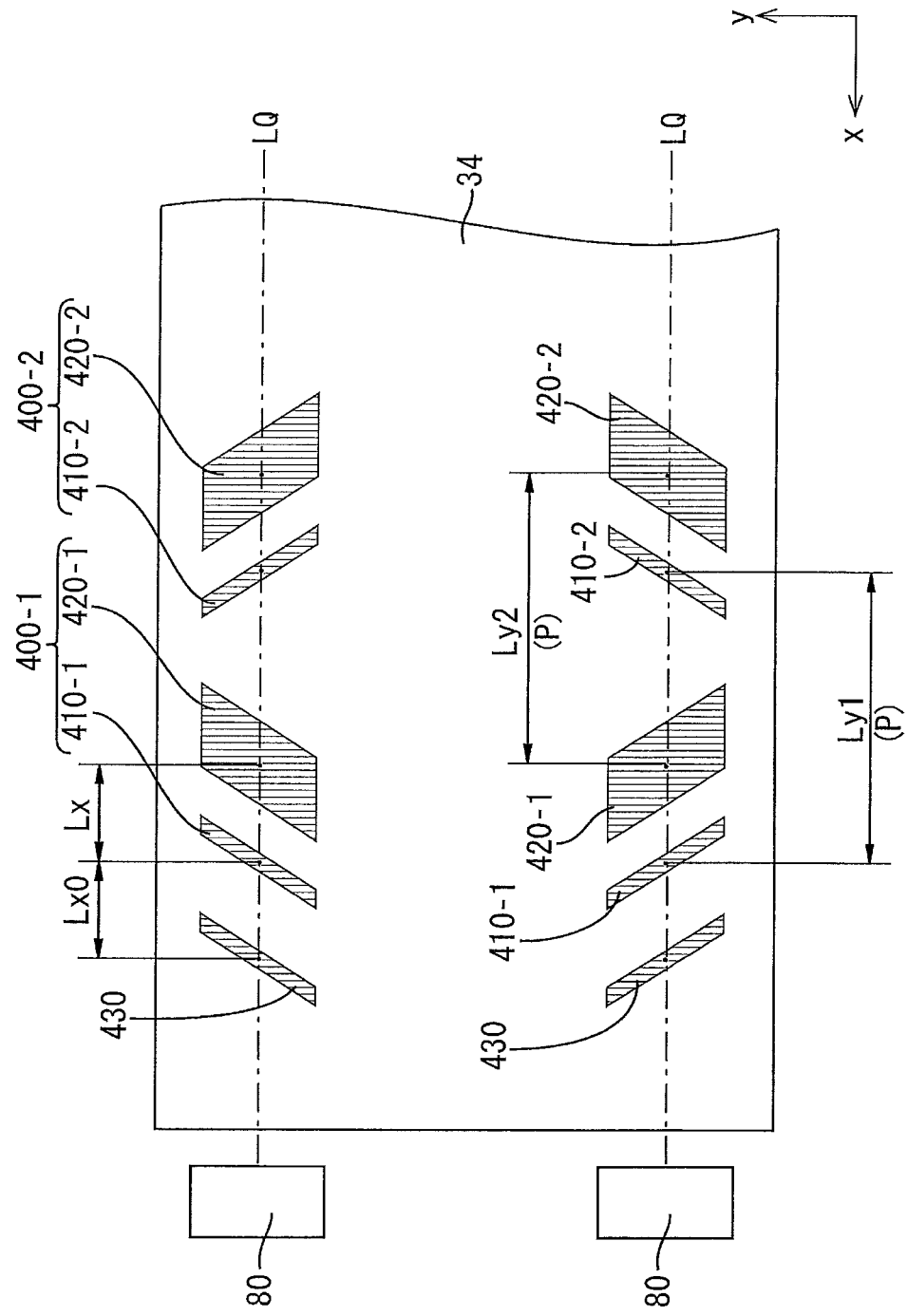
FIG. 17 is a plan view of the belt printed with error detection marks according to a fourth embodiment.

FIG. 17 shows error detection marks 400 according to the fourth embodiment. Each of the error detection marks 400 is configured of a first mark 410 and a second mark 420. The first mark 410 and second mark 420 are both printed using yellow toner, which has a higher diffuse reflectance than black toner. The first mark 410 and second mark 420 are slanted relative to the X-direction (belt moving direction), and are formed at a fixed interval in the same direction. The first mark 410 and second mark 420 have different line widths in the X-direction, with the second mark 420 having a wider line width than the first mark 410.

A pair of the first marks 410 and a pair of the second marks 420 are formed along the detection line LQ for each mark sensor 80. Each pair includes a positive direction line that is slanted at a positive angle to the X-direction and a negative direction line that is slanted at a negative angle. The notations "-1" and "-2" are appended to the reference numerals of the error detection marks 400 and their components to indicate their different slanted orientations. Further, a reference mark 430 is formed on the downstream side of the first mark 410-1. The reference mark 430 is printed in yellow toner at the same line width as the first mark 410. The reference mark 430, first marks 410, and second marks 420 are formed at equal intervals.

Varying the line widths of the first and second marks in this way produces a difference in magnitude of the diffuse reflection components, as when the first and second marks are printed at different toner densities. Accordingly, the control unit 100 of the printer 1 can detect reference distance Lx0 and center-point distance Lx from data produced by the mark sensors 80 when reading the error detection marks 400 in order to find a difference ΔLx between the reference distance Lx0 and center-point distance Lx, wherein the reference distance Lx0 being a distance between a center point of the reference mark 430 in the X-direction and a center point of the first mark 410 in the X-direction, and the center-point distance Lx being a distance between the center point of the first mark 410 in the X-direction and the center point of the second mark 420 in the X-direction. After finding the difference ΔLx, the control unit 100 can reference the conversion table to determine the measurement error Ux for the X-direction. Similarly, the control unit 100 can detect center-point distances Ly1 and Ly2 from data produced by the mark sensors 80 when reading the error detection marks 400 in order to determine a difference ΔLy between the center-point distances Ly1 and Ly2, wherein the center-point distance Ly1 being a distance between the center point of the first mark 410-1 in the X-direction and the center point of the first mark 410-2 in the X-direction, and the center-point distance Ly2 being a distance between the center point of the second mark 420-1 in the X-direction and the center point of the second mark 420-2 in the X-direction. By finding the difference ΔLy, the control unit 100 can reference the conversion table to determine the measurement error Uy for the Y-direction.

Fifth Embodiment

Figure 18:
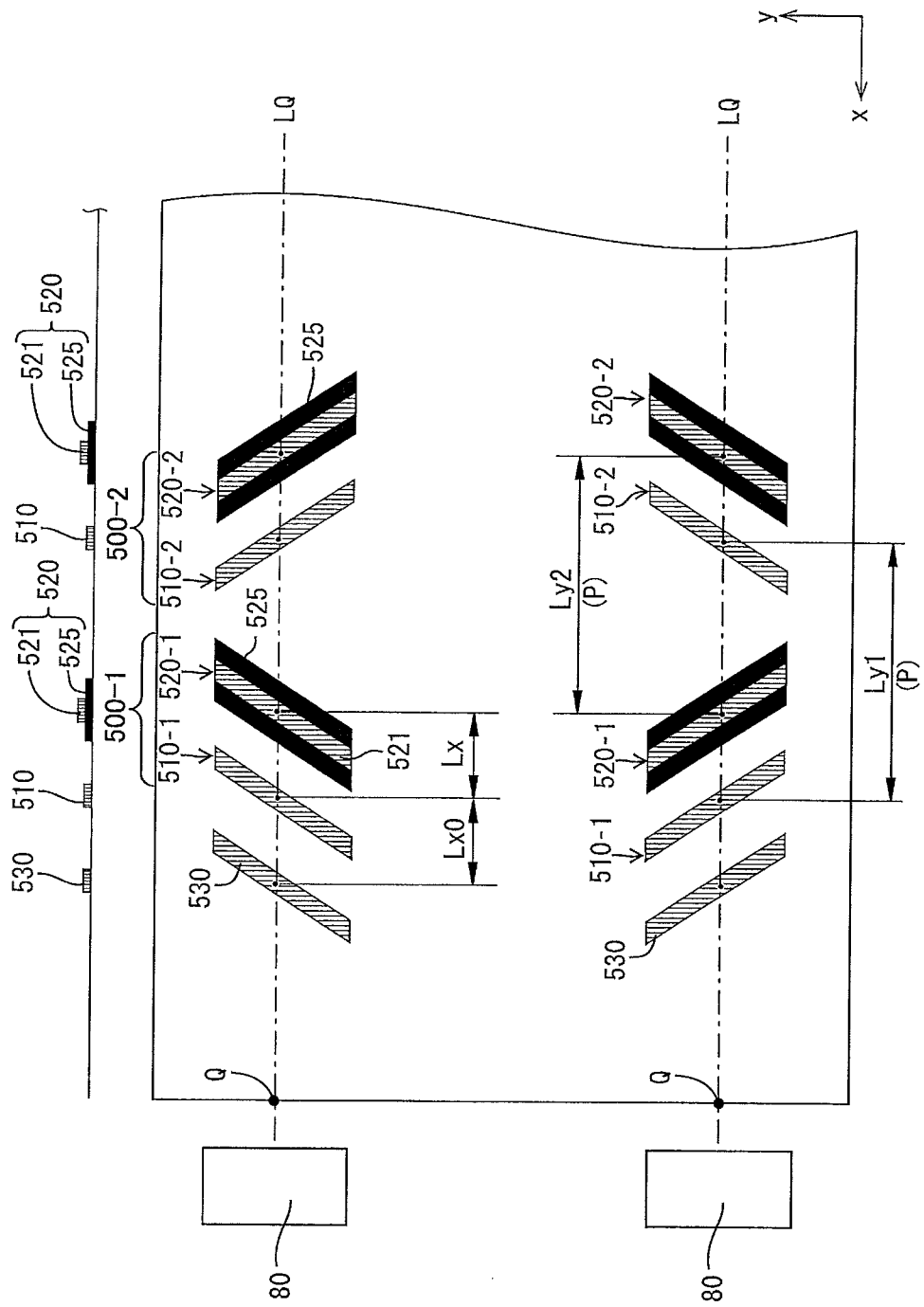
FIG. 18 is a plan view of the belt printed with error detection marks according to a fifth embodiment.

Next, the fifth embodiment of the invention will be described with reference to FIG. 18. FIG. 18 shows error detection marks 500 according to the fifth embodiment. Similarly to the error detection marks in the third and fourth embodiments, each of the error detection marks 500 includes a first mark 510, and a second mark 520. A reference mark 530 is also included in each error detection mark 500. The first mark 510 is printed on the belt surface using yellow toner. The second mark 520 is configured of a mask part 525 printed in black toner, and a main mark part 521 formed on top of the mask part 525. The main mark part 521 is printed in yellow toner and has a shorter dimension in the X-direction, i.e., a shorter line width, than the mask part 525. The reference mark 530 is printed using yellow toner.

Similarly to the error detection marks in the third and fourth embodiments, the first mark 510 and second mark 520 are slanted relative to the X-direction (belt moving direction), and are formed at a fixed interval in the same direction. A pair of the first marks 510 and a pair of the second marks 520 are formed along the detection line LQ for each mark sensor 80. Each pair includes a positive direction line that is slanted at a positive angle to the X-direction and a negative direction line that is slanted at a negative angle. The notations "-1" and "-2" are appended to the reference numerals of the error detection marks 500 and their components to indicate their different slanted orientations. The reference mark 530 is formed on the downstream side of the first mark 510-1. The reference mark 530, first marks 510, and second marks 520 are formed at equal intervals.

In the first through fourth embodiments, the processing units 40C, 40M, 40Y, and 40K are arranged in this order in the X direction (belt-moving direction) as shown in FIG. 1 so that the processing unit 40K is downstream in the X direction of the other remaining processing units 40C, 40M, and 40Y. However, according to the fifth embodiment, the processing units 40K, 40C, 40M, and 40Y are arranged in this order in the X direction (belt-moving direction) so that the processing unit 40K is upstream in the X direction of the other remaining processing units 40C, 40M, and 40Y.

In this configuration, the waveform of the light-reception signal corresponding to the first mark 510 includes both a diffuse reflection component and a specular reflection component, while the waveform of the light-reception signal corresponding to the second mark 520 includes only a diffuse reflection component because the specular reflection component is absorbed by the mask part 525. Hence, when the optical axis of the light-emitting element 81 is offset in the X-direction or Y-direction, waveform distortion in the light-reception signal will differ between the first mark 510 and second mark 520. As in the third and fourth embodiments, the control unit 100 of the printer 1 detects reference distance Lx0 and center-point distance Lx from data produced by the mark sensors 80 when reading the error detection marks 500 to find the difference ΔLx between the reference distance Lx0 and center-point distance Lx, wherein the reference distance Lx0 being a distance between a center point of the reference mark 530 in the X-direction and a center point of the first mark 510 in the X-direction, and the center-point distance Lx being a distance between the center point of the first mark 510 in the X-direction and the center point of the second mark 520 in the X-direction (center point of the main mark part 521 in the X-direction). The control unit 100 can then look up the difference ΔLx in the conversion table to determine the measurement error Ux for the X-direction. Similarly, the control unit 100 determines center-point distances Ly1 and Ly2 from data produced by the mark sensors 80 to find the difference ΔLy between the center-point distances Ly1 and Ly2, and looks up the difference ΔLy in the conversion table to determine the measurement error Uy for the Y-direction, wherein the center-point distance Ly1 being a distance between the center point of the first mark 510-1 in the X-direction and the center point of the first mark 510-2 in the X-direction, and the center-point distance Ly2 being a distance between the center point of the second mark 520-1 in the X-direction (center point of the main mark part 521 in the second mark 520-1 in the X-direction) and the center point of the second mark 520-2 in the X-direction (center point of the main mark part 521 in the second mark 520-2 in the X-direction).

Sixth Embodiment

Next, a sixth embodiment of the invention will be described. While the printer 1 determines the measurement error Ux and Uy of the mark sensor 80 in the first embodiment described above, an inspection apparatus is used in the sixth embodiment to determine measurement error Ux and Uy. The inspection apparatus is used to inspect the integrity of the mark sensors 80 prior to their assembly in the printer 1. The inspection apparatus has the same structure as that of the printer 1 shown in FIGS. 1 and 2, including the sheet-feeding unit 3, image-forming unit 5, conveying mechanism 7, fixing unit 9, and belt-cleaning mechanism 20, and has the control unit 100 for controlling these components. The inspection apparatus has a structure that enables the mark sensors 80 to be mounted on the lower rear side of the belt 34 constituting the conveying mechanism 7 as the target of inspection as shown in FIG. 1.

Once the mark sensors 80 are mounted in the system, the system executes the following inspection process. The inspection process is configured of steps S10-S70 in FIG. 11 of the color registration correction process, while omitting steps S80 through S110.

As in the color registration correction process executed by the printer 1, in S50 of the inspection process, the control unit 100 of the inspection apparatus calculates the measurement error Ux and Uy produced by the mark sensors 80 for the registration marks 170. In S60 the control unit 100 compares the measurement error Ux and Uy calculated in S50 with their corresponding upper limits to determine whether the mark sensors 80 are suitable. In other words, the control unit 100 determines that a mark sensor 80 is defective when either of the measurement error Ux and Uy for the mark sensor 80 is higher than or equal to its upper limit, and determines that a mark sensor 80 is non-defective, or good, when both the measurement error Ux and Uy for the mark sensor 80 are less than their upper limits.

Mark sensors 80 found to be good are installed in the printer 1 and mark sensors 80 found to be defective are discarded. This procedure effectively prevents defective mark sensors 80 from being mounted in the printer 1.

Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

(1) For example, the laser printer and the inspection apparatus in the embodiments described above have a direct transfer system for transferring images directly onto sheet, but the present invention may be applied to a printer with an intermediate transfer system. In this case, the intermediate transfer belt serves as a carrier on which the image-forming unit prints registration marks and error detection marks, and mark sensors are provided to read the marks formed on the intermediate transfer belt.

(2) In the embodiments, the error detection marks are printed using yellow toner, but these marks may be printed in another toner color, such as magenta or cyan.

What is claimed is:

1. An inspection apparatus for inspecting a sensor of an image forming apparatus, wherein the image forming apparatus comprises:
   a carrier configured to move circularly in a carrier moving direction;
   the sensor,
      wherein the sensor comprises:
         a light-emitting element configured to emit light toward a surface of the carrier; and
         a light-receiving element arranged at such a position relative to the light-emitting element that the light-receiving element is able to receive a specular reflection component of the light that is emitted from the light-emitting element and is reflected from the surface of the carrier, the light-receiving element being configured to output a light-reception signal corresponding to an intensity of the received light, and
      wherein the sensor is configured to detect registration marks that are used for correcting offsets of image forming positions; and
   a plurality of image forming units configured to transfer a plurality of developing agents to the carrier,
wherein the inspection apparatus comprises:
   a control unit configured to perform:
      an error detection mark forming process comprising:
         controlling at least one image forming unit among the plurality of image forming units to transfer one or more developing agents to the carrier to form an error detection mark on the carrier along a detection line that passes through an exposure position, at which the light emitted from the light-emitting element is exposed, in the carrier moving direction, wherein the error detection mark comprises a first mark and a second mark that are spaced from each other by a fixed distance in the carrier moving direction, the first mark and the second mark being formed on the carrier such that a diffuse reflection component of light reflected from the first mark has an amount different from an amount of a diffuse reflection component of light reflected from the second mark;
      a first measurement process comprising:
         controlling the light-emitting element to emit the light toward the surface of the carrier;
         controlling the light-receiving element to:
            output a first light-reception signal corresponding to an intensity of the light that is reflected from the first mark and is received by the light-receiving element when the first mark passes through the exposure position; and
            output a second light-reception signal corresponding to an intensity of the light that is reflected from the second mark and is received by the light-receiving element when the second mark passes through the exposure position; and
      a measurement error determination process comprising:
         determining, based on a relationship between a reference value and a value calculated using the first light-reception signal and the second light-reception signal, a measurement error of the sensor that is configured to detect the registration marks.

2. The inspection apparatus according to claim 1,
wherein the at least one image forming unit comprises:
   a first image forming unit configured to transfer a first developing agent of black having a first diffuse reflectance to the carrier; and
   a second image forming unit configured to transfer a second developing agent having a second diffuse reflectance that is higher than the first diffuse reflectance to the carrier, and
wherein the error detection mark forming process performed by the control unit comprises:
   forming the first mark by controlling the first image forming unit to transfer the first developing agent to the surface of the carrier; and
   forming the second mark by:
      controlling the second image forming unit to transfer the second developing agent to the surface of the carrier to form a main mark part; and
      controlling the first image forming unit to transfer the first developing agent to the carrier to form mask parts that cover a pair of edges of the main mark part relative to the carrier moving direction.

3. The inspection apparatus according to claim 2,
wherein the first mark is configured of a single line.

4. The inspection apparatus according to claim 2,
wherein the first mark is configured of two lines.

5. The inspection apparatus according to claim 2,
wherein the first and second image forming units are arranged in line in the carrier moving direction such that the second image forming unit is positioned upstream of the first image forming unit in the carrier moving direction.

6. The inspection apparatus according to claim 2,
wherein during the measurement error determination process, using the first light-reception signal and the second light-reception signal, the control unit calculates a center-point distance between a center point of the first mark and a center point of the second mark, and determines a measurement error of the sensor defined in the carrier moving direction based on a difference between the calculated center-point distance and a reference value,
wherein the center point of the first mark being a central position in the carrier moving direction between upstream and downstream edges of the first mark that intersect the detection line,
wherein the mask parts in the second mark comprising an upstream-side mask part and a downstream-side mask part, the downstream-side mask part being positioned downstream of the upstream-side mask part in the carrier moving direction, a gap being formed between a downstream edge of the upstream-side mask part and an upstream edge of the downstream-side mask part in the carrier moving direction such that part of the main mark part is exposed through the gap in the carrier moving direction, and
wherein the center point of the second mark being a center position in the carrier moving direction between the upstream edge of the downstream-side mask part that intersects the detection line and the downstream edge of the upstream-side mask part that intersects the detection line.

7. The inspection apparatus according to claim 6,
wherein the control unit is configured to convert the difference into the measurement error by using a conversion table.

8. The inspection apparatus according to claim 7,
wherein the conversion table includes a plurality of sections corresponding to a plurality of different values for light reflectance of the surface of the carrier.

9. The inspection apparatus according to claim 2,
wherein during the error detection mark forming process, the control unit controls the first image forming unit and the second image forming unit to form two first marks and two second marks on the surface of the carrier along the detection line such that the two first marks are nonparallel with each other and spaced from each other by a predetermined distance in the carrier moving direction and such that the two second marks are nonparallel with each other and spaced from each other in the carrier moving direction by a distance the same as the predetermined distance, and
wherein during the measurement error determination process, using the first light-reception signals obtained for the two first marks, the control unit determines center points of the respective first marks and determines a center-point distance between these center points as a center-point distance for the first marks,
using the second light-reception signal obtained for the two second marks, the control unit determines center points of the respective second marks and determines a center-point distance between these center points as a center-point distance for the second marks, and
the control unit determines a measurement error of the sensor in a perpendicular direction from a difference between the center-point distance for the first marks and the center-point distance for the second marks, the perpendicular direction being perpendicular to the carrier moving direction and being defined along the surface of the carrier,
the center point of each first mark being a central position in the carrier moving direction between upstream and downstream edges of the each first mark that intersect the detection line,
the mask parts in each second mark comprising an upstream-side mask part and a downstream-side mask part, the downstream-side mask part being positioned downstream of the upstream-side mask part in the carrier moving direction, a gap being formed between a downstream edge of the upstream-side mask part and an upstream edge of the downstream-side mask part in the carrier moving direction such that part of the main mark part is exposed through the gap in the carrier moving direction,
the center point of each second mark being a center position in the carrier moving direction between the upstream edge of the downstream-side mask part that intersects the detection line and the downstream edge of the upstream-side mask part that intersects the detection line.

10. The image forming inspection apparatus according to claim 1,
wherein the control unit controls the at least one image forming unit to form the first mark and the second mark in accordance with either one of a rotational period of a roller circularly driving the carrier and a rotational period of photosensitive drums constituting the image forming units.

11. The inspection apparatus according to claim 1,
wherein the control unit performs an error process if the determined measurement error is greater than or equal to a predetermined upper limit.

12. The inspection apparatus according to claim 1,
wherein the at least one image forming unit comprises:
a first image forming unit configured to transfer a first developing agent of black having a first diffuse reflectance to the carrier; and
a second image forming unit configured to transfer a second developing agent having a second diffuse reflectance that is higher than the first diffuse reflectance to the carrier, and
wherein the error detection mark forming process performed by the control unit comprises:
forming the first mark by controlling the second image forming unit to transfer the second developing agent to the surface of the carrier, wherein the first mark has a first density; and
forming the second mark by controlling the second image forming unit to transfer the second developing agent to the surface of the carrier, wherein the second mark has a second density that is different from the first density.

13. The inspection apparatus according to claim 1,
wherein the at least one image forming unit comprises:
a first image forming unit configured to transfer a first developing agent of black having a first diffuse reflectance to the carrier; and
a second image forming unit configured to transfer a second developing agent having a second diffuse reflectance that is higher than the first diffuse reflectance to the carrier, and
wherein the error detection mark forming process performed by the control unit comprises:
forming the first mark by controlling the second image forming unit to transfer the second developing agent to the surface of the carrier, wherein the first mark has a first length in the carrier moving direction; and
forming the second mark by controlling the second image forming unit to transfer the second developing agent to the surface of the carrier, wherein the second mark has a second length in the carrier moving direction that is different from the first length.

14. The inspection apparatus according to claim 1,
wherein the control unit is further configured to perform:
a registration mark forming process comprising:
controlling the plurality of image forming units to form a plurality of registration marks on the surface of the carrier on the detection line;
a second measurement process comprising:
controlling the light-emitting element to emit light; and
controlling the light-receiving element to output third light-reception signals corresponding to intensities of light received when the registration marks pass through the exposure position; and
a correction process comprising:
controlling the image forming units to correct offsets of image-forming positions based on the measurement error of the sensor and on values that are calculated using the third light-reception signals and are indicative of relative positions among the registration marks.

* * * * *